(12) United States Patent
MacDonald et al.

(10) Patent No.: US 10,940,531 B1
(45) Date of Patent: Mar. 9, 2021

(54) METHODS AND SYSTEMS FOR IMPROVING A SURFACE FINISH OF AN INVESTMENT CASTING

(71) Applicant: The Boeing Company, Chicago, IL (US)

(72) Inventors: Elaine MacDonald, Wildwood, MO (US); Daniel Joseph Braley, St. Peters, MO (US); Brandon Heath Wegge, Brentwood, MO (US); Russell W. Cochran, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/670,290

(22) Filed: Oct. 31, 2019

(51) Int. Cl.
*B22C 9/04* (2006.01)
*B22C 7/02* (2006.01)
*B33Y 80/00* (2015.01)

(52) U.S. Cl.
CPC ............... *B22C 9/04* (2013.01); *B22C 7/02* (2013.01); *B33Y 80/00* (2014.12)

(58) Field of Classification Search
CPC .... B22C 9/00; B22C 9/04; B22C 7/00; B22C 7/02; B22C 9/043; B22C 9/046; B22C 7/023
See application file for complete search history.

(56) References Cited

U.S. PATENT DOCUMENTS

| | | |
|---|---|---|
| 4,556,528 A | 12/1985 | Gersch et al. |
| 4,600,546 A | 7/1986 | Grundei |
| 4,660,623 A | 4/1987 | Ashton |
| 9,751,260 B2 | 9/2017 | Dietrich et al. |

(Continued)

FOREIGN PATENT DOCUMENTS

| | | |
|---|---|---|
| DE | 19851250 | 5/2000 |
| JP | 201823982 | 2/2018 |

OTHER PUBLICATIONS

European Patent Office, Extended European Search Report for related European Patent Application No. 20198878, dated Dec. 8, 2020.

(Continued)

*Primary Examiner* — Kevin P Kerns
*Assistant Examiner* — Steven S Ha
(74) *Attorney, Agent, or Firm* — Dascenzo Gates Intellectual Property Law, P.C.

(57) ABSTRACT

Methods of improving a surface finish of a casting pattern for an investment casting process, methods of forming an investment casting, and smoothed casting patterns. The methods for forming the casting patterns having an improved surface finish include sealing the casting pattern with a first coating material to form a sealed casting pattern and smoothing the sealed casting pattern with a second coating material to form a smoothed casting pattern. The methods for forming the investment casting include covering a smoothed casting pattern with a mold material to define an enclosed mold volume, curing the mold material to form a cured mold material, flowing the smoothed casting pattern from the enclosed mold volume to define a void space, filling the void space with a liquid investment casting material, and solidifying the liquid casting material to define an investment casting.

20 Claims, 9 Drawing Sheets

(56) References Cited

U.S. PATENT DOCUMENTS

2015/0027653 A1\* 1/2015 Guerche ................ B22C 9/088
164/47
2015/0283601 A1\* 10/2015 Oguma .................... B22C 9/04
164/517

OTHER PUBLICATIONS

Machine-generated English language translation of the abstract of DE 19851250, downloaded from Esapcenet.com on Dec. 18, 2020.
Machine-generated English language translation of JP 201823982, provided with the Extended European Search Report from Espacenet.com on Dec. 8, 2020.

\* cited by examiner

METHODS AND SYSTEMS FOR IMPROVING A SURFACE FINISH OF AN INVESTMENT CASTING

FIELD

The present invention generally relates to the investment casting process.

BACKGROUND

The investment casting process is utilized to form parts, components, and 3-dimensional (3D) structures having any variety of size, shape, and level of complexity. The investment casting process generally includes forming and curing a mold material onto a casting pattern, removing the casting pattern from the cured mold material to produce a void space within the cured mold material, filling a liquid investment casting material in the void space, and solidifying the liquid investment casting material to produce an investment casting. In this way, the investment casting generally conforms to or reflects the 3D structure defined by the void space, thereby producing a part, component, or 3D structure that generally takes the form of the casting pattern.

In recent times, casting patterns increasingly are being formed with additive manufacturing. Utilizing additively manufactured casting patterns increases a speed at which a given investment casting initially is produced and/or decreases a cost associated with low volume production. However, additive manufacturing typically utilizes layer-by-layer material deposition to generate or form 3D structures, which can introduce a surface roughness onto the structure. This surface roughness often is defined by a stepped surface finish resulting from the additively deposited layers. More specifically, typical additively manufactured casting patterns exhibit a surface roughness on the order of about 600-1000 microinches $R_a$, and this surface roughness usually is transferred to the investment casting during the investment casting process. Such rough surfaces often have undesirable effects. For example, investment castings having rough surface finishes can exhibit a reduction in elongation (ductility), which decreases a toughness of the investment casting, such as the ability of the investment casting to handle mechanical loads and impact. Functionally, the reduced elongation resulting from the rough surface finish can reduce the fatigue life and the fatigue strength of the investment casting, as material cracks can form more easily with low elongation. Moreover, surface roughness can cause discontinuities in applied loads, causing stress concentrations or stress raisers to form, which further compounds the issues associated with low elongation.

Utilizing a larger number of thinner layers during additive manufacturing improves the surface finish of additively manufactured casting patterns, and thereby improves the surface finish of the corresponding investment castings. However, this also adds to the expense and time required to produce the casting pattern. Thus, there exists a need for improved methods and systems for improving the surface finish of investment castings.

SUMMARY

Methods of improving a surface finish of a casting pattern for an investment casting process, methods of forming an investment casting, and smoothed casting patterns are disclosed herein. The methods for forming the casting patterns having an improved surface finish include sealing the casting pattern to form a sealed casting pattern and smoothing the sealed casting pattern to form a smoothed casting pattern. The sealing includes sealing the casting pattern with a first coating material to define the sealed casting pattern, and the smoothing includes smoothing the sealed casting pattern with second coating material to define the smoothed casting pattern.

The smoothed casting pattern includes a casting pattern, a first coating material that coats and seals the casting pattern, and a second coating material that coats the first coating material.

The methods for forming the investment casting include covering a smoothed casting pattern with a mold material to define an enclosed mold volume, curing the mold material to form a cured mold material, and flowing the smoothed casting pattern from the enclosed mold volume to define a void space. The methods for forming the investment castings further include filling the void space with a liquid investment casting material and solidifying the liquid casting material to define an investment casting.

DESCRIPTION

Figure 1:
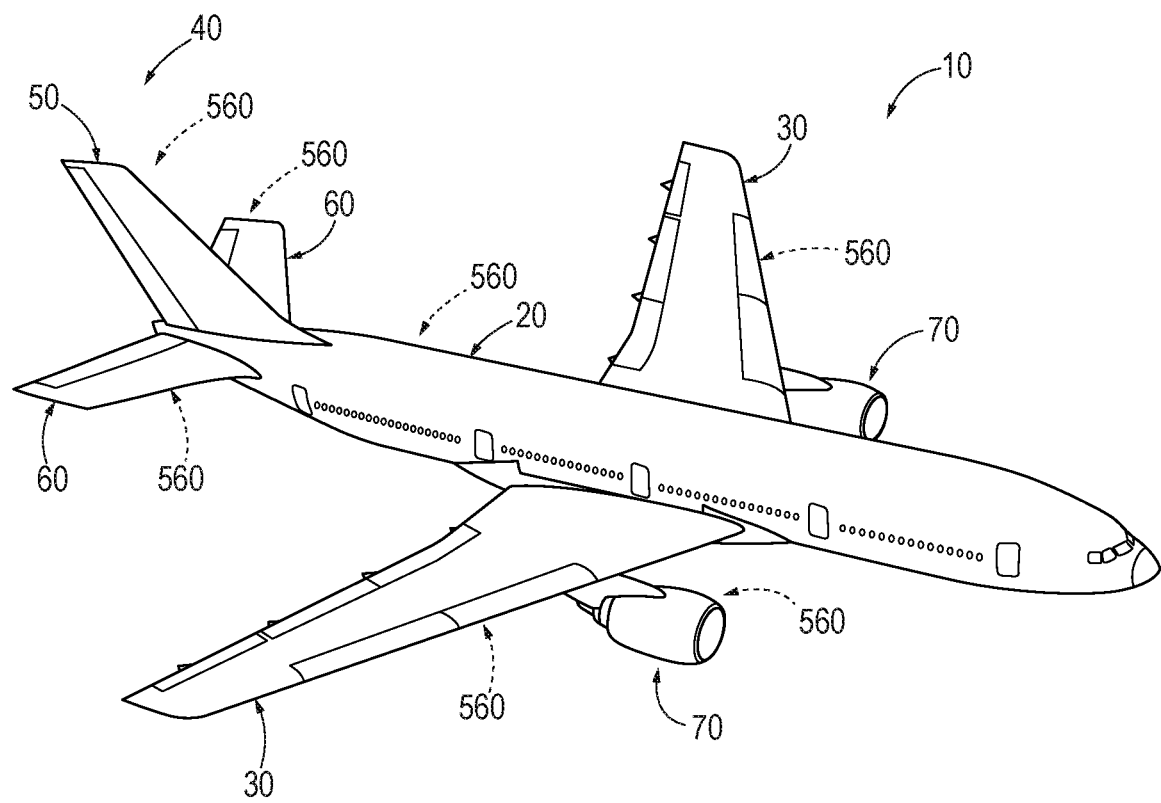
FIG. 1 is an illustration of examples of an aircraft including at least one investment casting formed utilizing the smoothed casting patterns and/or methods, according to the present disclosure.

FIG. 1 illustrates examples of aircraft that includes and/or utilizes investment castings 560, according to the present disclosure. FIGS. 2-6 provide illustrative, non-exclusive examples of methods 100 for forming smoothed casting patterns, and examples of portions of smoothed casting patterns 325 formed according to the present disclosure. FIGS. 7-13 provide illustrative, non-exclusive examples of methods 200 for forming investment castings utilizing smoothed casting patterns, and examples of portions of investment castings 560 formed according to the present disclosure. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is an illustration of examples of aircraft 10 that includes and/or utilizes at least one investment casting 560 disclosed in and/or formed according to the present disclosure and/or formed utilizing at least one smoothed casting pattern disclosed in and/or formed according to present disclosure. Aircraft 10 includes a fuselage 20 and at least one wing 30, which is operatively attached to and/or extends from fuselage 20. Aircraft 10 also includes at least one engine 70, which is operatively attached to fuselage 20, such as via a corresponding wing 30. Aircraft 10 further includes a tail assembly 40 that is operatively attached to and/or at least partially defined by fuselage 20, and tail assembly 40 includes at least one vertical stabilizer 50 and/or horizontal stabilizer 60. In some examples, fuselage 20, wing(s) 30, engine(s) 70, tail assembly 40, vertical stabilizer 50, and/or horizontal stabilizer(s) 60 include a corresponding investment casting 560 and/or include one or more components that include, or are at least partially defined by, the corresponding investment casting 560. Likewise, some examples of aircraft 10 include at least one attachment structure for operatively attaching two or more of the fuselage 20, wing(s) 30, engine(s) 70, tail assembly 40, vertical stabilizer 50, and/or horizontal stabilizer(s) 60 together. The attachment structure may include a corresponding investment casting 560 and/or may include one or more components that include, or are at least partially defined by, the corresponding investment casting 560. While FIG. 1 illustrates a fixed wing aircraft, other apparatuses are within the scope of the present disclosure, and the present disclosure is not limited to aircraft and aircraft applications. Illustrative non-exclusive examples of other apparatuses that are suitable to be constructed with investment casting 560 include, but are not limited to, spacecraft, watercraft, land vehicles, structural towers, rotorcraft, missiles, satellites, and/or masts etc.

As discussed in more detail herein, the smoothed casting patterns and/or methods according to the present disclosure are utilized to produce, generate, and/or form investment castings that have and/or exhibit an improved surface finish, or a decreased surface roughness, when compared to conventional investment casting processes. In some examples, the disclosed methods are utilized to improve the surface finish of casting patterns that initially were created utilizing an additive manufacturing process. Such additively manufactured casting patterns often will exhibit a stepped surface finish, which is undesirable for certain investment castings. The disclosed methods permit conventional additively manufactured casting patterns to be utilized to produce investment castings that do not exhibit the stepped surface finish that generally is caused by conventional investment casting processes that utilize the conventional additively manufactured casting patterns. Stated another way, the smoothed casting patterns disclosed herein exhibit a decreased surface roughness compared to a surface roughness generally observed with additively manufactured casting patterns. This decreased surface roughness causes a corresponding decrease in stress risers in the resultant investment casting when compared to stress risers generally produced with conventional additively manufactured casting patterns. Additionally or alternatively, this decreased surface roughness causes decreased stress concentration in the resultant investment casting when compared to a stress concentration generally produced with conventional additively manufactured casting patterns.

Figure 2:
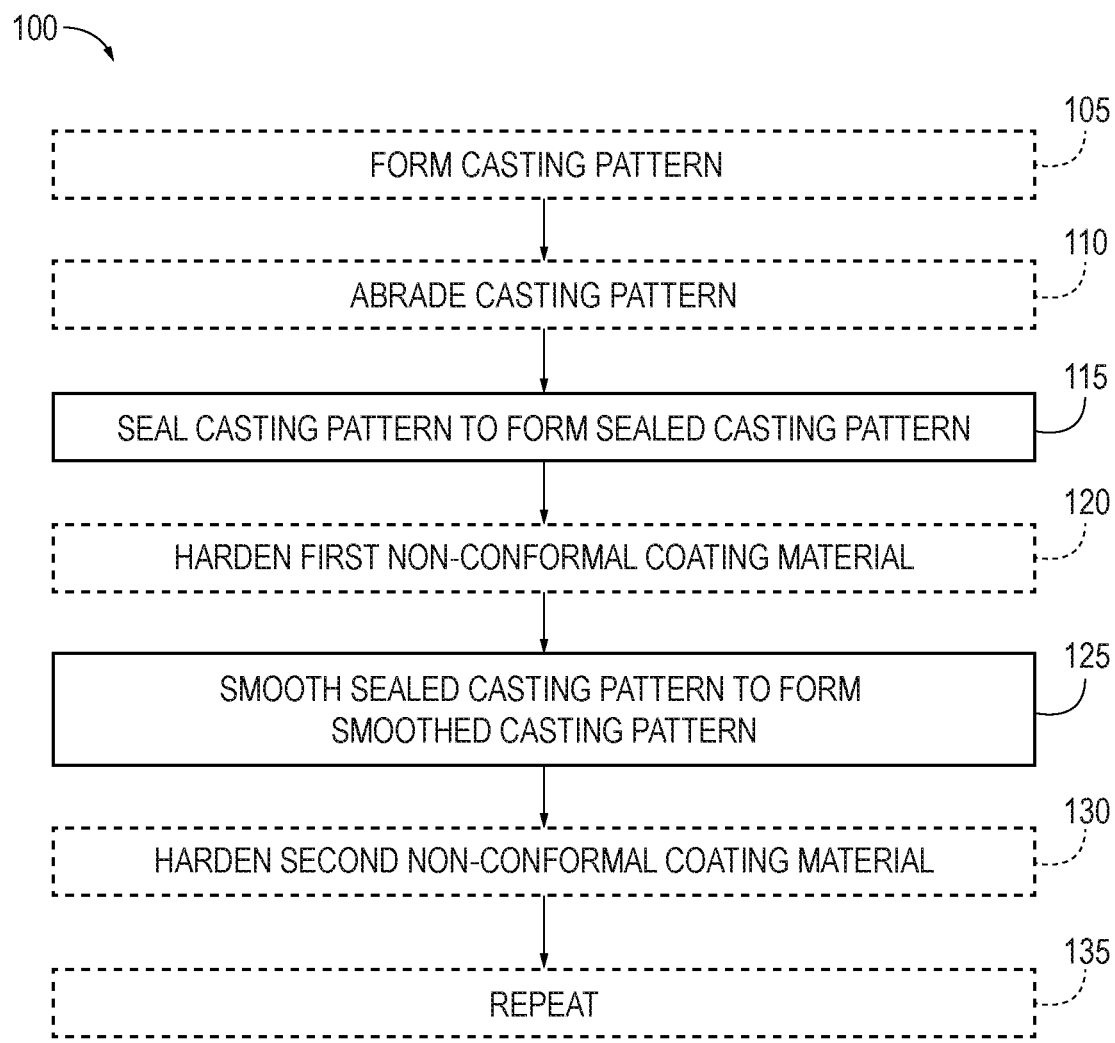
FIG. 2 is a flowchart depicting examples of methods of improving a surface finish of a casting pattern for an investment casting process, according to the present disclosure.

FIG. 2 is a flowchart depicting an exemplary method 100 of improving a surface finish of casting patterns for an investment casting process, according to the present disclosure. FIGS. 3-6 are schematic illustrations of examples of structures that are formed according to one or more portions of methods 100 of FIG. 2 and/or examples of smoothed casting patterns 325 that are formed utilizing methods 100 of FIG. 2.

Methods 100 include sealing the casting pattern to form a sealed casting pattern at 115 and smoothing the sealed casting pattern to form a smoothed casting pattern at 125. In some examples, methods 100 include forming a casting pattern at 105, abrading the casting pattern at 110, hardening a first coating material at 120, hardening a second coating material at 130, and/or repeating at least a portion of the methods at 135.

As used herein, the phrase, "smoothed casting pattern" refers to a casting pattern, such as the conventional casting patterns discussed herein, that has been smoothed, or has had its surface roughness decreased, utilizing methods 100 of FIG. 2. As an example, some "smoothed casting patterns" according to the present disclosure have been sealed according to the sealing at 115 and also have been smoothed according to the smoothing at 125, which are discussed in more detail herein. As another example, some "smoothed casting patterns" according to the present disclosure are coated with a first coating material, which seals the casting pattern to generate a sealed casting pattern, and also with a second coating material, which smoothes the casting pattern to generate the smoothed casting pattern.

Forming the casting pattern at 105, when performed, includes forming any suitable casting pattern in any suitable manner. In some examples, the casting pattern includes a three-dimensional (3D) structure that is formed via an additive manufacturing process. Examples of additive manufacturing processes include material extrusion, directed energy deposition, material jetting, binder jetting, sheet lamination, vat polymerization, powder bed fusion, 3D printing, rapid prototyping, direct digital manufacturing, layered manufacturing, and/or additive fabrication.

One or more materials are used to form the casting pattern, and the one or more materials are selected such that the casting pattern possesses any suitable material properties. As discussed in more detail with respect to FIG. 7, a smoothed casting pattern that includes the casting pattern is coated with a mold material, such as a ceramic, and the mold material subsequently is cured onto the smoothed casting pattern during the investment casting process. After the mold material is cured onto the smoothed casting pattern, the casting pattern material(s) that define the smoothed casting pattern are removed from the cured mold material, such as by liquefying and pouring the casting pattern material(s) from the cured mold material and/or burning the casting pattern material(s) out from the cured mold material. As such, in some examples, the casting pattern material(s) are selected such that the casting pattern material(s) will liquefy, will melt, and/or will burn away without residue being formed during the investment casting process.

If residue is formed during removal of the casting pattern material(s), the casting pattern material(s) often are selected such that the residue is easily removed from the cured mold material. Additionally or alternatively, in some examples the casting pattern material(s) often are selected such that the casting pattern material(s) do not leave foreign debris within the cured mold material during the investment casting process. In some examples, the casting pattern material(s) are selected and/or sealed such that the mold material does not diffuse into the casting pattern during the investment casting process. In some examples, the casting pattern material(s) are selected to have a casting pattern material coefficient of thermal expansion that is less than or equal to a mold material coefficient of thermal expansion of the mold material. Such a configuration decreases a potential for cracking of the mold material when the casting pattern material(s) are removed from the mold material.

In view of the above, in some instances it also is beneficial for the casting pattern material to have a lower melting point, a lower ignition temperature, a lower boiling point, a lower viscosity, and/or a higher vapor pressure than the mold material and/or the cured mold material such that the casting pattern material is readily removed from the cured mold material during the investment casting process. To list a few examples, the casting pattern material(s) include one or more of a wax, a non-permeable wax, a plastic, a polymer, polymethyl methacrylate (PMMA), and/or nylon. In specific examples, the forming at 105 includes forming at least one of a polymeric casting pattern and a PMMA casting pattern.

The casting pattern is fabricated to possess any suitable size, shape, and/or level of complexity, for example, with additive manufacturing. While additive manufacturing frequently is more economical and/or requires less lead time relative to other techniques such as wax injection mold tooling, in some cases, and as discussed, additive manufacturing can produce a rough surface on the casting pattern. More specifically, many additive manufacturing processes utilize layer-by-layer material deposition to produce shaped 3D structures. In some instances, this layer-by-layer material deposition produces a stepped surface finish due to partially overlapping layers with nominally exposed edges. Thus, at least in some such instances, forming casting pattern 105 includes forming a casting pattern with the stepped surface finish.

As discussed in more detail herein, methods 100 include sealing the casting pattern with a first coating material at 115 and smoothing the casting pattern with a second coating material at 125. In some cases, the sealing at 115 and/or the smoothing at 125 contribute to, or increase, a size, a volume, and/or an external dimension of the smoothed casting pattern relative to the casting pattern. With this in mind, and in some examples, the forming at 105 includes forming an undersized, or a deliberately undersized, casting pattern. For examples in which methods 100 include forming the undersized casting pattern, the casting pattern is deliberately undersized by an amount that is respective to, or based upon, the nominal change in the size of the casting pattern that is accompanied by performing the sealing at 115, the smoothing at 125, and/or optionally the abrading at 110. Stated another way, the undersized casting pattern is sized such that the smoothed casting pattern is appropriately sized for the investment casting process, such as after performing the abrading at 110, the sealing at 115, and/or the smoothing at 125.

In some examples, the forming at 105 includes forming a casting pattern that includes a thin-walled casting pattern. The thin-walled casting pattern may include the surface roughness, examples of which are disclosed herein with respect to the casting pattern. In some examples, the thin-walled casting pattern is a hollow casting pattern. In some examples, the thin-walled casting pattern includes an average casting pattern wall thickness that is at least one of less than 10 millimeters (mm), less than 5 mm, less than 4 mm, less than 3 mm, less than 2.5 mm, less than 2 mm, less than 1.5 mm, less than 1 mm, less than 0.5 mm, at least 1.5 mm, at least 2 mm, at least 3 mm, and/or at least 5 mm.

The comparably thin average casting pattern wall thickness of the thin-walled casting pattern may cause the thin-walled casting pattern to be fragile, or more susceptible to deformation compared to a typical casting pattern. In some examples, it is desirable to smooth the surface roughness of the thin-walled casting pattern to improve the surface finish of the thin-walled casting pattern. In some instances, smoothing the thin-walled casting pattern utilizing conventional techniques, such as smoothing via the abrading at 110, causes deformation of the thin-walled casting pattern, as some of these conventional techniques remove material from, compact the walls of, and/or stress the thin-walled casting pattern. With this in mind, methods 100 are configured to smooth the casting pattern without deforming, or without significant deformation of, the casting pattern during the smoothing. Thus, methods 100 are better suited for smoothing thin-walled casting patterns compared to conventional techniques.

Figure 3:
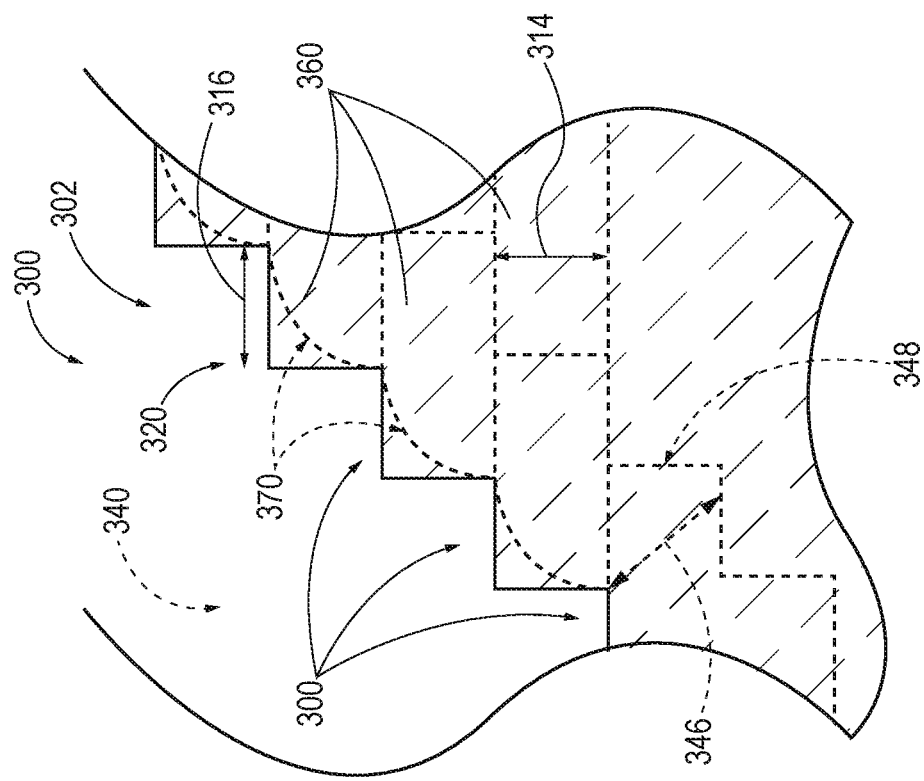
FIG. 3 is a schematic illustration of examples of a portion of casting patterns utilized in the methods of FIG. 2.

FIG. 3 illustrates examples of a portion of a casting pattern 300 that are utilized with methods 100, according to the present disclosure. As illustrated in the example of FIG. 3, casting patterns 300 includes a surface finish 302 having a surface roughness 320 that includes a plurality of steps that form and/or define a stepped surface finish 304. Stepped surface finish 304 also may be referred to herein as a stair stepped surface finish 304, a layered surface finish 304, an irregular surface finish 304, a terraced surface finish 304, an undulating surface finish 304, a rough surface finish 304, a stacked surface finish 304, a notched surface finish 304, a saw-toothed surface finish 304, and/or a puckered surface finish 304. Stepped surface finish 304 of casting pattern 300 includes a series of layers 360, in which each layer has a layer thickness that defines a step height 314, or an average step height 314, and each layer has a step offset 316, or an average step offset 316, from the preceding layer. While FIG. 3 generally illustrates each layer 360 as having approximately the same layer thickness and approximately the same step offset 316, it is within the scope of the present disclosure that each layer 360 possesses a different layer thickness and/or a different step offset 316. As indicated in FIG. 3, in the dashed lines running behind stepped surface finish 304, in some examples, casting pattern 300 includes thin-walled casting pattern 346 having an average casting pattern wall thickness 348 that is thinner than a standard casting pattern and examples of which are disclosed herein.

As discussed, and in some examples, stepped surface finish 304 is the result of additive manufacturing of casting pattern 300, in which each step of stepped surface finish 304 is a portion of a layer formed from additive manufacturing. The surface roughness 320 of surface finish 302 is reduced by reducing step height 314 and/or step offset 316. For examples that include forming casting pattern 300 with additive manufacturing, reducing step height 314 and/or step offset 316 is achieved by applying thinner layers 360 during additive manufacturing of casting pattern 300. However, applying thinner layers with additive manufacturing can be more time consuming and some degree of step height 314 and step offset 316 still is present in surface finish 302. Thus, in many examples it is desirable to reduce surface roughness 320 of surface finish 302 after forming casting pattern 105, such as by performing a remainder of methods 100.

Referring back to FIG. 2, in some examples, methods 100 include abrading the casting pattern at 110. With reference to the examples illustrated in FIG. 3, the abrading at 110, when performed, reduces surface roughness 320 of surface finish 302 by reducing step height 314, by reducing step offset 316, and/or by flattening and/or rounding off stepped surface finish 304. Stated another way, abrading the casting pattern at 110 smoothes surface roughness 320 of surface finish 302 by removing and/or compacting material from stepped surface finish 304 to produce an abraded stepped surface finish 370. In the illustration of FIG. 3, abraded stepped surface finish 370 includes surface roughness 320 having rounded, flattened, and/or diminished outside edges relative to the stepped surface finish 304 formed at 105. As such, in some instances, the abrading at 110 also reduces the size of casting pattern 300. Stated yet another way, the abrading at 110, when performed, produces a casting pattern with an abraded, with a smoothed, and/or with a smoother surface relative to the casting pattern that was formed during the forming at 105. Examples of the abrading at 110 include sanding the casting pattern, grinding the casting pattern, and/or abrasive blasting the casting pattern.

Again with reference to FIG. 2, methods 100 include sealing the casting pattern to form the sealed casting pattern at 115. The sealing at 115 may be performed subsequent to the forming at 105, subsequent to the abrading at 110, prior to the hardening at 120, and/or prior to the smoothing at 125.

The sealing at 115 includes coating the casting pattern with a first coating material and/or applying the first coating material to the casting pattern to form and/or to define the sealed casting pattern. The first coating material is configured to seal the casting pattern. The first coating material is applied to the casting pattern to cover some, most, or the entire surface of the casting pattern to produce the sealed casting pattern. The first coating material also may be referred to as a sealing coating material, a first coating layer material, a sealing layer material, and/or a first surface layer material.

As described in more detail herein with respect to the examples represented in FIG. 7, the mold material is applied and subsequently cured on the surface of the smoothed casting pattern during the investment casting process. With this in mind, the sealing at 115 is performed to seal the casting pattern such that the mold material does not enter into, fill, and/or coat any portion of the sealed casting pattern that is not intended as a surface portion of the smoothed pattern. For example, some casting patterns include inclusions, recesses, perforations, and/or channels that the first coating material is configured to coat and/or seal such that the mold material does not enter into these regions. In some examples, the first coating material also contributes to the smoothing of the stepped surface finish of the casting pattern. In some examples, the first coating material is configured to limit chemical interaction between the mold material and the casting pattern.

The casting pattern may be coated with the first coating material in any suitable manner. In some examples, the sealing at 115 includes spraying the first coating material onto the casting pattern, painting the first coating material onto the casting pattern, dipping the casting pattern into a volume of the first coating material, and/or enrobing the casting pattern with and/or within the first coating material.

The first coating material may be in any suitable physical state when it is applied to the casting pattern during the sealing at 115. As examples, the first coating material is applied to the casting pattern as a solid, a powder, a sheet, a liquid, a vapor, a solution, a melt, and/or a dispersion. Additionally or alternatively, the first coating material may be applied to the casting pattern under any suitable set of conditions, such as temperatures, pressures, and/or variations thereof, such that the first coating material is in a desired physical state and/or exhibits a desired physical property during the application process.

Any set of one or more suitable materials are selected to form the first coating material such that first coating material seals the casting pattern. In some examples, the first coating material includes one or more of the same material(s) that form the casting pattern, and in some examples, the first coating material includes one or more materials that are different from the materials that define the casting pattern.

As described above with respect to the forming at 105, the first coating material may be selected such that the first coating material is easily removed from the cured mold during the investment casting process, such as by liquefying and/or burning. An example of the first coating material includes a first wax. Examples of the first wax include one or more of a natural wax, a synthetic wax, stearic acid, paraffin, an animal-based wax, a vegetable-based wax, a resin, terpene resin, petroleum resin, a rosin, a rosin ester, gum damar, a modified phenolic, a low molecular weight alkyd, beeswax, carnuba wax, candelilla wax, mineral wax, microcrystalline wax, montan, an amide wax, an ester wax, a Fischer-Tropsch wax, a castor oil derived wax, and/or combinations thereof. As yet more examples, the first coating material additionally or alternatively includes one or more of chlorinated naphthalene, chlorinated biphenyl, a polymer, a crosslinking polymer, a thermosetting polymer, and/or combinations thereof.

The one or more materials that form the first coating material additionally or alternatively may be selected such that the first coating material possesses a particular, or a desired, viscosity and/or surface tension during one or more steps of methods 100, such as during the sealing at 115. As examples, the one or more materials that form the first coating material are selected such that the first coating material possess a particular, or a desired, viscosity and/or a surface tension that facilitates the sealing at 115.

As discussed in more detail herein with respect to the smoothing at 125, the one or more materials that form the first coating material additionally or alternatively may be selected such that the first coating material possess a first viscosity and/or a first surface tension that is the same as, or different from, a second viscosity and/or a second surface tension of the second coating material that is utilized during the smoothing at 125. Such a configuration facilitates a desired interfacing between the first coating material and the second coating material and/or facilitates a desired smoothing of the casting pattern upon being coated with the first coating material and the second coating material.

Figure 4:
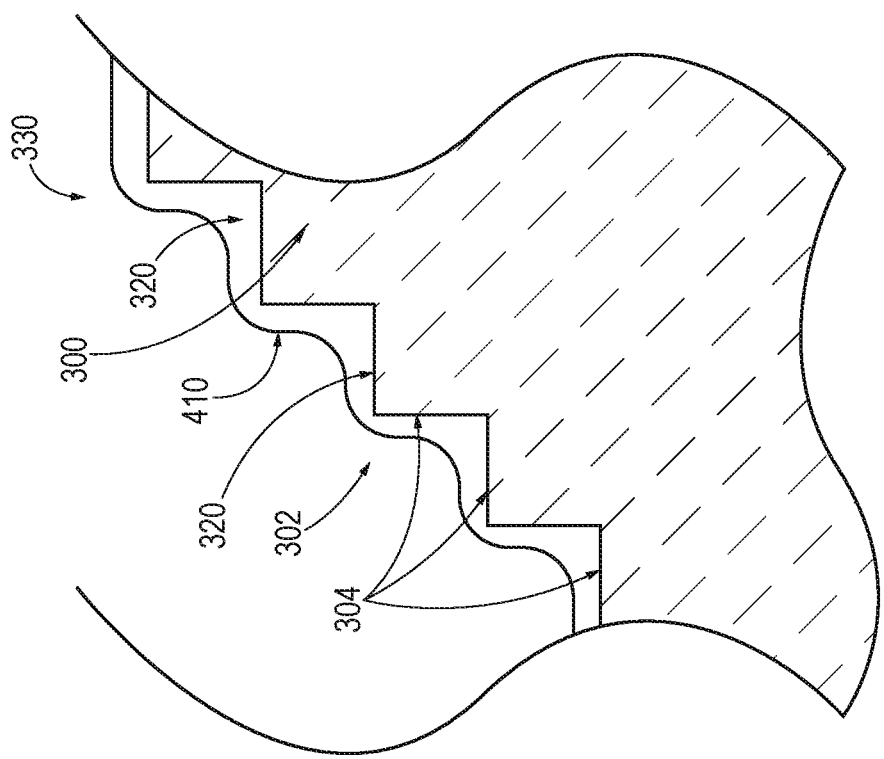
FIG. 4 is a schematic illustration of an example of sealed casting pattern formed utilizing the methods of FIG. 2.

FIG. 4 illustrates an example of a portion of a sealed casting pattern 330 formed according to the sealing 115 of methods 100. More specifically, FIG. 4 illustrates sealed casting pattern 330 as including casting pattern 300 that is coated with a first coating material 410. In the specific example of FIG. 4, casting pattern 300 includes stepped surface finish 304, and first coating material 410 coats stepped surface finish 304. In FIG. 4, first coating material 410 completely coats the surface of casting pattern 300 to seal casting pattern 300, thus forming sealed casting pattern 330. As discussed herein, and in some examples, casting pattern 300 includes and/or is undersized casting pattern 340.

As shown in the examples represented in FIG. 2, methods 100 optionally include hardening the first coating material at 120. The hardening at 120, when utilized, is performed subsequent to the sealing at 115 and/or prior to the smoothing at 125. The hardening at 120 includes hardening the first coating material in any suitable manner. As examples, the hardening at 120 includes one or more of hardening via cooling, hardening via solvent evaporation, hardening via curing, hardening via thermosetting, and/or hardening via crosslinking. In a more specific example, the hardening at 120 includes heating the first coating material such that the one or more materials that form the first coating material harden via curing, crosslinking, thermosetting, and/or solvent removal. In another more specific example, the hardening at 120 additionally or alternatively includes cooling the first coating material to solidify the first coating material. In some examples, the hardening at 120 produces a more resilient sealed casting pattern. The more resilient sealed casting pattern is beneficial to the subsequent steps of methods 100 and/or the investment casting process. As yet more examples, the hardening at 120 includes increasing the first viscosity and/or the first surface tension of first coating material 410. In some such examples, the hardening at 120 enhances an interface between the first coating material and the second coating material that is formed and/or defined during the smoothing at 125.

Again referring to the examples represented in FIG. 2, methods 100 further include smoothing the sealed casting pattern to form the smoothed casting pattern at 125. The smoothing at 125 is performed subsequent to the hardening at 120, subsequent to the sealing at 115, prior to hardening at 130, and/or prior to repeating at 135. The smoothing at 125 includes coating the sealed casting pattern with the second coating material and/or applying the second coating material to and/or onto the sealed casting pattern. The second coating material is applied to the sealed casting pattern to cover some, most, or the entire surface of the sealed casting pattern. Stated another way, the second coating material is applied to the sealed casting pattern to cover some, most, or the entire surface of first coating material. The second coating material also may be referred to herein as a second coating layer material, a smoothing layer material, a smoothing coating material, and a second surface layer material.

The second coating material and/or the smoothing at 125 are configured to smooth the surface of the sealed casting pattern, for example, by filling, attenuating, shrouding, and/or blanketing surface undulations in sealed casting pattern 300 that are caused by surface roughness 320 in the casting pattern. Put in slightly different terms, in some examples, second coating material is a non-conformal coating material that is configured produce an exterior surface that is non-conformal with the surface of the underlying sealed casting pattern. Stated yet another way, the smoothing at 120 is configured to provide the resulting smoothed casting pattern with a smoother surface finish relative to the sealed casting pattern provided during the sealing at 115 and/or the hardening at 120. As discussed in more detail herein, the smoother surface finish of the smoothed casting pattern interfaces with the mold material during the investment casting process, such that the resulting cured mold material is rendered with a smooth surface, with a smoother surface, and/or a lower surface roughness than would be obtained utilizing the casting pattern without first performing the sealing at 115 and the smoothing at 125. As discussed in more detail herein, forming a mold casting with a smooth surface is beneficial to the fatigue strength, the fatigue life, and/or the reduction of stress risers in a corresponding investment casting.

The second coating material may be applied to the sealed casting pattern to form the smoothed casting pattern in any suitable manner. In some examples, the smoothing at 125 includes spraying the second coating material onto the sealed casting pattern, painting the second coating material onto the sealed casting pattern, dipping the sealed casting pattern into a volume of the second coating material, and/or enrobing the sealed casting pattern with and/or within the second coating material.

The second coating material may be in any suitable physical state when it is applied to the sealed casting pattern to smooth the sealed casting pattern. In some examples, the second coating material is applied to the casting pattern as a solid, a powder, a sheet, a liquid, a vapor, a solution, a melt, and/or a dispersion. In some examples, the second coating material is applied under any suitable set of conditions, such as temperatures, pressures, and/or variations thereof, such that the second coating material is in a desired physical state and/or exhibits desired physical properties during the smoothing at 125.

Any set of one or more suitable materials are selected to form the second coating material such that the second coating material smoothes the sealed casting pattern. In some examples, the one or more materials that are selected to form the second coating material include one or more of the same materials as those that are selected to form the first coating material and/or the casting pattern. In some examples, the one or more materials that are selected to form the second coating material are different from the materials that are selected to form the first coating material and/or the casting pattern.

As described above with respect to the casting pattern and the first coating material, the one or more materials that form the second coating material often are selected such that the materials that form the second non-conforming coating material are easily removed from the cured mold during the investment casting process, such as by liquefying or burning. An example of the second coating material includes a second wax. Examples of the second wax include one or more of natural wax, a synthetic wax, stearic acid, paraffin, an animal-based wax, a vegetable-based wax, a resin, terpene resin, petroleum resin, a rosin, a rosin ester, gum damar, a modified phenolic, a low molecular weight alkyd, beeswax, carnuba wax, candelilla wax, mineral wax, microcrystalline wax, montan, an amide wax, an ester wax, a Fischer-Tropsch wax, a castor oil derived wax, and/or combinations thereof. As yet more examples, the second coating material additionally or alternatively includes one or more of chlorinated naphthalene, chlorinated biphenyl, a polymer, a crosslinking polymer, a thermosetting polymer, and/or combinations thereof.

The one or more materials that form the second coating material additionally or alternatively are selected such that the second coating material possesses a particular, or desired, viscosity and/or a particular, or desired, surface tension during methods 100 and/or during the smoothing at 125. In some examples, the one or more materials that form the second coating material are selected such that the second coating material possess the particular viscosity and/or the particular surface tension to facilitate applying of the second coating material during the smoothing at 125.

In some examples, the one or more materials that form the second coating material are selected such that the second coating material possesses a second viscosity and/or a second surface tension during the smoothing at 125. In some examples, the second viscosity and/or the second surface tension are the same as and/or different from the first viscosity and/or the first surface tension of the first coating material during the sealing at 115. In some such examples, it is beneficial for the first viscosity during the sealing at 115 to be less than the second viscosity during the smoothing at 125, such that the second coating material blankets or shrouds surface roughness in the sealed casting pattern during the smoothing at 125. In some such examples, the second viscosity during the smoothing at 125 is at least a threshold multiple of the first viscosity during the sealing at 115. Examples of the threshold multiple of the second viscosity during the smoothing 125 relative to the first viscosity during the sealing at 115 include at least one of at least 1, at least 1.1, at least 1.2, at least 1.4, at least 1.6, at least 1.8, at least 2, at least 2.5, at least 3, at least 4, and/or at least 5.

Additionally or alternatively, the one or more materials that form the second coating material are selected such that the first surface tension of the first coating material during the sealing at 115 is less than the second surface tension of the second coating material during the smoothing at 125, such as to facilitate interfacing between the first and second coating materials and/or smoothing of the surface roughness of the sealed casting pattern. In examples, the second surface tension during the smoothing at 125 is at least a threshold multiple of the first surface tension during the sealing at 115. Examples of the threshold multiple of the second surface tension during the smoothing at 125 relative to the first surface tension during the sealing at 115 include at least one of at least 1, at least 1.05, at least 1.1, at least 1.15, at least 1.2, at least 1.3, at least 1.4, at least 1.5, at least 1.6, at least 1.7, at least 1.8, at least 1.9, and/or at least 2.

Figure 5:
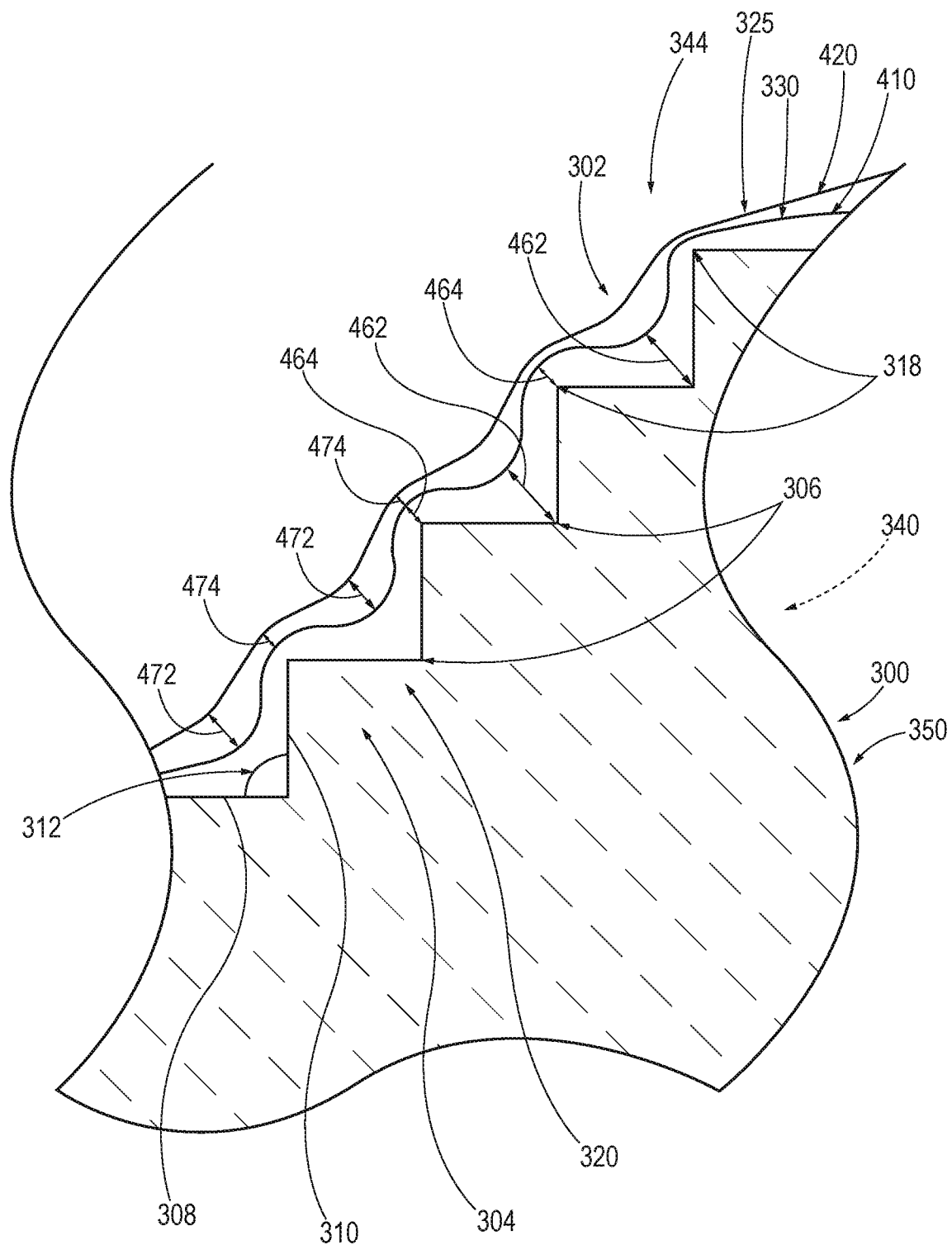
FIG. 5 is a schematic illustration of an example of a smoothed casting pattern formed utilizing the methods of FIG. 2.

FIG. 5 illustrates an example of a portion of smoothed casting pattern 325 formed according to methods 100. More specifically, FIG. 5 illustrates smoothed casting pattern 325 as including casting pattern 300, first coating material 410, and a second coating material 420. In the specific example illustrated in FIG. 5, casting pattern 300 has stepped surface finish 304, first coating material 410 is layered on stepped surface finish 304, and second coating material 420 is layered on first coating material 410. As illustrated, second coating material 420 blankets first coating material 410 to smooth sealed casting pattern 330 and forms smoothed casting pattern 325. As discussed in more detail herein, second coating material 420, or an external surface and/or contour of second coating material 420, also may be described as defining a desired shape 344 of the investment casting.

As illustrated in the examples represented in FIG. 2, methods 100 optionally includes hardening the second coating material at 130. The hardening at 130, when performed, is subsequent to the smoothing at 125. The hardening at 130 includes hardening the second coating material in any suitable manner, such as by performing one or more of hardening via cooling, hardening via solvent evaporation, hardening via curing, hardening via thermosetting, and/or hardening via crosslinking. In a more specific example, the hardening at 130 includes heating the second coating material such that the one or more materials that form the second coating material harden via curing, crosslinking, thermosetting, and/or solvent removal. In another more specific example, hardening the second coating material at 130 additionally or alternatively includes cooling the second coating material to solidify the second coating material. Particularly for embodiments in which methods 100 do not include the hardening at 120, hardening the second coating material 130 includes hardening the first coating material, in which both the first and second coating materials are hardened at least partially simultaneously. In some examples, the hardening at 130 produces a more resilient smoothed casting pattern, which is beneficial to the subsequent steps of method 100 and/or the investment casting process.

As illustrated in the examples schematically represented in FIG. 2, methods 100 optionally include repeating at 135. The repeating at 135, when performed, includes repeating any suitable portion, fraction, and/or subset of methods 100 in any suitable order. In some examples, the repeating at 135 includes repeating a single step of methods 100 one or more times, or repeating any set of steps of methods 100 one or more times before proceeding to a subsequent step. In some examples, the repeating at 135 includes repeating all of methods 100 any number of times such as to produce any number of smoothed casting patterns.

In some specific examples, the repeating at 135 includes repeating the smoothing at 125 a plurality of times. As described above, the initial smoothing includes forming a smoothing coating of the second coating material on the sealed casting pattern to define the smoothed casting pattern, which is described herein as the first smoothing coating. Repeating the smoothing at 125 a first time includes applying a second smoothing coating of the second coating material, or of a subsequent coating material, onto the first smoothing coating to define the smoothed casting pattern and/or to further smooth the smoothed casting pattern.

When methods 100 include repeating the smoothing at 125 a plurality of times, each subsequent smoothing coating of the second, or subsequent, coating material is applied on a preceding smoothing coating to form a plurality of smoothing coatings on the sealed casting pattern and/or to define the smoothed casting pattern. The plurality of smoothing coatings include at least 2, at least 3, at least 4, at least 5, at least 6, at least 7, at least 8, or at least 10 smoothing coatings.

The one or more materials that form the subsequent smoothing coating may be selected to include one or more of the same materials as the preceding coating or the one or more materials that form the subsequent smoothing coating may be selected to be different from the materials that form the preceding smoothing coating. As discussed in more detail herein with respect to the second coating material, each subsequent coating material may be in any suitable physical state when it is applied to the smoothed casting pattern. In some examples, the one or more materials that form the subsequent coating material are selected such that the subsequent coating material possess a subsequent coating viscosity during the repeating at 125 that may be the same as and/or different the second viscosity during the smoothing at 115. In some examples it is beneficial for the subsequent viscosity during the repeating at 125 to be less than the second viscosity during the smoothing at 125, such that the smoothed casting pattern is rendered with a fine and/or glossed finish. In some such examples, the second viscosity is at least a multiple threshold of the subsequent viscosity, with examples of the threshold ratio including at least one of at least 1, at least 1.1, at least 1.2, at least 1.4, at least 1.6, at least 1.8, at least 2, at least 2.5, at least 3, at least 4, and/or at least 5.

Figure 6:
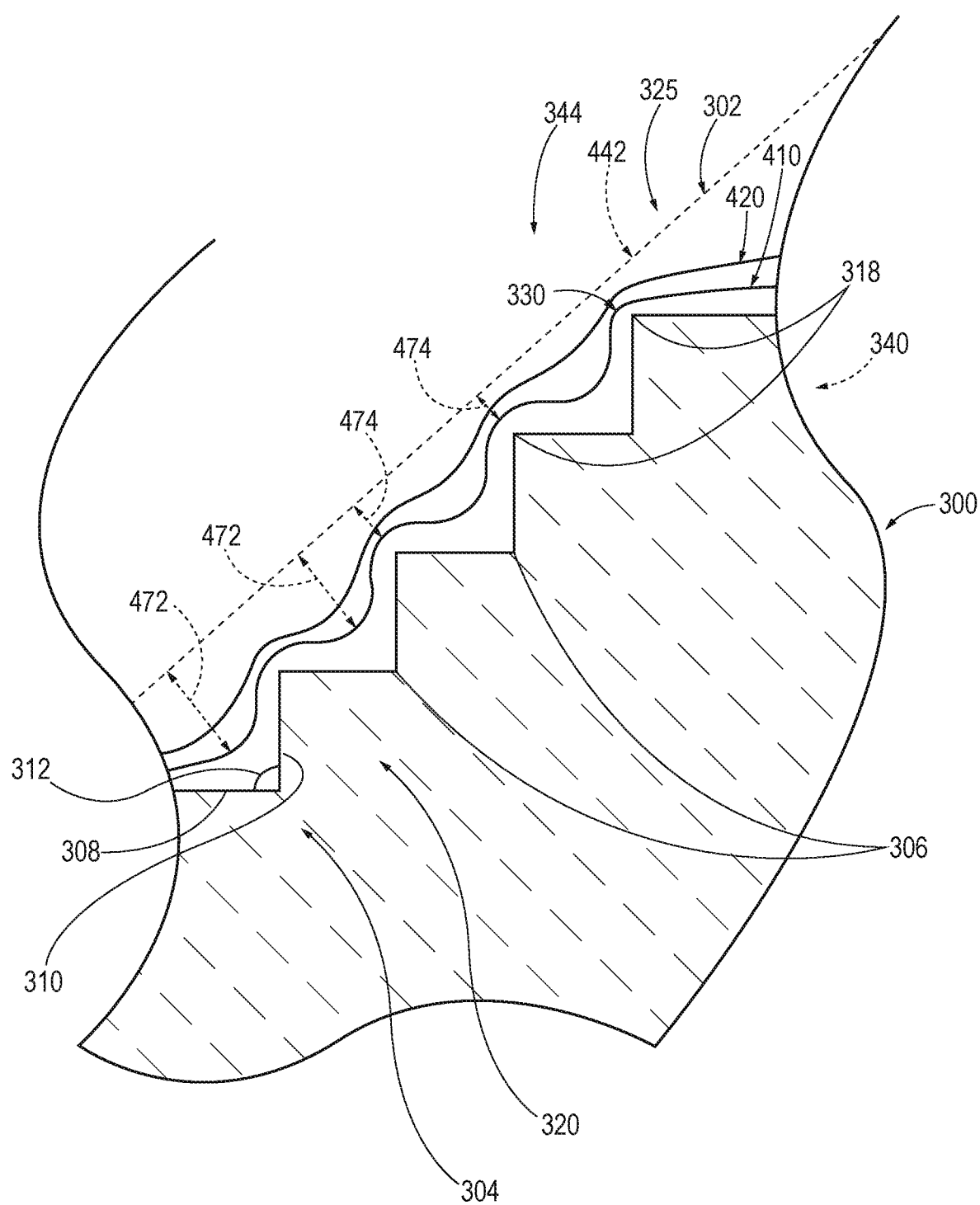
FIG. 6 is a schematic illustration of examples of a smoothed casting pattern formed utilizing the methods of FIG. 2.

FIG. 6 provides an illustrative example of a portion of smoothed casting pattern 325 formed according to step 135 of methods 100. More specifically, FIG. 6 illustrates smoothed casting pattern 325 having a plurality of smoothing coatings 442. In the specific example of FIG. 6, smoothed casting pattern 325 includes casting pattern 300 having stepped surface finish 304, first coating material 410 layered on stepped surface finish 304 to define sealed casting pattern 330, and second coating material 420 (i.e. first smoothing coating 420) layered on sealed casting pattern 330. As indicated by the dashed line, smoothed casting pattern 325 further includes one or more additional smoothing coatings applied atop first smoothing coating 420 to define plurality of smoothing coatings 442 and a smoothed surface of smoothed casting pattern 325. As illustrated by the nominally straight dashed line that indicates plurality of smoothing coatings 442, each successive smoothing coating further smoothes, or decreases a surface roughness of, smoothed casting pattern 325. As discussed herein, second coating material 420 and/or plurality of smoothing coatings 442 contribute to, or increase, the size, volume, and/or external dimension of the smoothed casting pattern relative to the casting pattern. Thus, in some such examples, casting pattern 300 includes undersized casting pattern 340, such that the smoothed casting pattern 325 defines a desired shape of the investment casting.

Returning to FIG. 5, an example of a portion of smoothed casting pattern 325 formed according to methods 100 is illustrated. More specifically, FIG. 5 illustrates smoothed casting pattern 325 as including casting pattern 300 defined by a casting pattern material 350, first coating material 410 coated on casting pattern 300 to seal casting pattern 300, and second coating material 420 coated on first coating material 410 to smooth sealed casting pattern 330 and define smoothed casting pattern 325. In some examples, casting pattern 300 includes undersized casting pattern 340.

In the specific example illustrated in FIG. 5, casting pattern 300 includes surface roughness 320 defined by stepped surface finish 304 having a plurality of steps. In FIG. 5, stepped surface finish 304 is illustrated as including a plurality of inside corners 306 and a plurality of outside corners 318, in which each step of the plurality of steps includes a first surface 308 and a second surface 310 that intersect to form an inside corner of the plurality of inside corners 306. First surface 308 and second surface 310 of each step further intersect with an intersection angle 312 at an inside corner, examples of which include intersection angles 312 of at least 50 degrees, at least 60 degrees, at least 70 degrees, at least 80 degrees, at least 85 degrees, at least 89 degrees, substantially 90 degrees, at most 130 degrees, at most 120 degrees, at most 110 degrees, at most 100 degrees, at most 95 degrees, and/or at most 91 degrees.

With continued reference to the specific example of FIG. 5, first coating material 410 coats casting pattern 300 with a first inside coating thickness 462 and a first outside coating thickness 464, in which first inside coating thickness 462 is defined as the thickness of first coating material 410 at plurality of inside corners 306, and first outside coating thickness 464 is defined as the thickness of first coating material 410 at plurality of outside corners 318. Put in slightly different terms, first coating material 410 preferentially coats plurality of inside corners 306 by a first coating ratio defined by a ratio of first inside coating thickness 462 to first outside coating thickness 464. Examples of the first coating ratio include at least 1, at least 1.1, at least 1.2, at least 1.3, at least 1.4, at least 1.5, at least 2, at least 3, at least 4, at least 5, at least 6, at least 8, at least 10, at most 100, at most 80, at most 60, at most 50, at most 40, at most 30, at most 20, at most 10, and/or at most 5.

Likewise, as indicated in the specific example represented in FIG. 5, second coating material 420 coats first coating material 410 with a second inside coating thickness 472 and a second outside coating thickness 474, in which second inside coating thickness 472 is defined as the thickness of second coating material 420 at plurality of inside corners 306, and second outside coating thickness 474 is defined as the thickness of second coating material 420 at plurality of outside corners 318. Stated differently, second coating material 420 is described as coating sealed casting pattern 330 by a second coating ratio defined by a ratio of second inside coating thickness 472 to second outside coating thickness 474. Examples of the second coating ratio include at least 1, at least 1.2, at least 1.3, at least 1.4, at least 1.5, at least 2, at least 3, at least 4, at least 5, at least 6, at least 8, at least 10, at most 100, at most 80, at most 60, at most 50, at most 40, at most 30, at most 20, at most 10, and/or at most 5.

As illustrated in the examples represented FIG. 6, second coating material 420 may be defined as a first smoothing coating, and smoothed casting pattern 325 optionally includes one or more additional smoothing coatings coated on second coating material 420 to define plurality of smoothing coatings 442. In such examples, second inside coating thickness 472 is defined as a thickness of plurality of smoothing coatings 442 at plurality of inside corners 306, and second outside coating thickness 474 is defined as the thickness of plurality of smoothing coatings at plurality of outside corners 318.

With continued reference to the example represented in FIG. 5, the second coating ratio, when utilized, is an indication of a smoothing effect of second coating material 420 on surface finish 302 of smoothed casting pattern 325. More specifically, in the example shown, second inside coating thickness 472 is illustrated as being larger in magnitude than second outside coating thickness 474, thus resulting in a larger second coating ratio. In some examples, a larger second coating ratio contributes to smooth, fill, round, and/or diminish inside corners 306 and/or outside corners 318 by filling or shrouding surface roughness 320 that is defined by stepped surface finish 304.

As such, in some examples, second coating material 420 is described as flattening stepped surface finish 304 to define smoothed casting pattern 325. In some examples, second coating ratio is a threshold multiple of the first coating ratio, with examples of the threshold multiple including at least one of at least 1, at least 1.1, at least 1.2, at least 1.3, at least 1.4, at least 1.5, at least 1.6, at least 1.7, at least 1.8, at least 1.9, at least 2, at least 2.5, at least 3, at least 4, or at least 5. As discussed in more detail herein, surface finish 302 of smoothed casting pattern 325 also may be described as defining and/or contributing to desired shape 344 of the investment casting.

Further indicated in FIG. 5, casting pattern 300 is formed from casting pattern material 350. Examples of casting pattern material 350 are disclosed herein.

Figure 7:
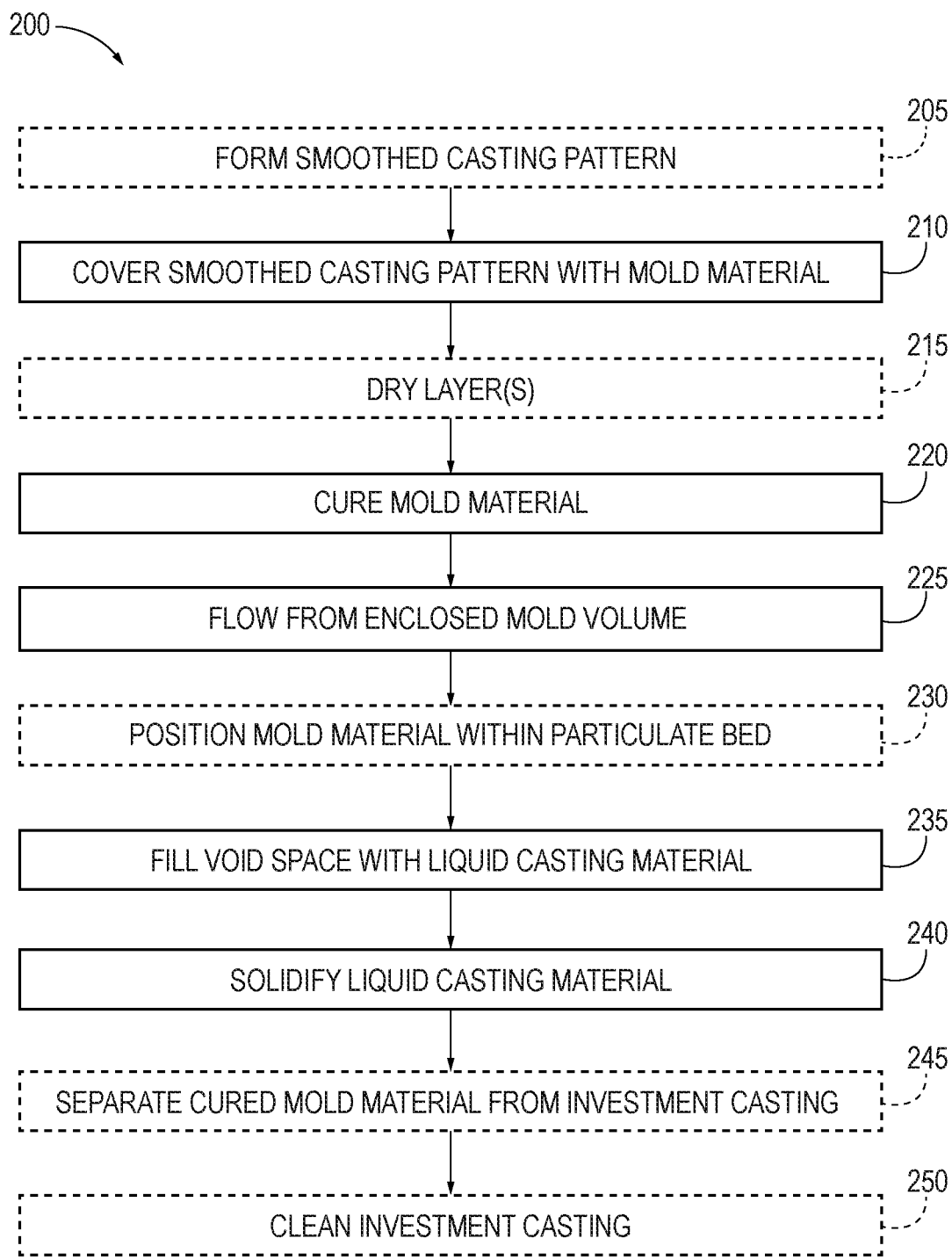
FIG. 7 is a flowchart depicting methods of forming an investment casting, according to the present disclosure.

FIG. 7 is a flowchart depicting examples of methods 200 of forming an investment casting according to the present disclosure. FIGS. 8-13 are schematic illustrations of examples of structures formed according to portions of methods 200.

Methods 200 include covering a smoothed casting pattern with a mold material at 210, curing the mold material at 220, flowing the smoothed casting pattern from a cured mold material at 225, filling a void space in the cured mold material with a liquid casting material at 235, and solidifying the liquid casting material at 240 to form an investment casting. In some examples, methods 200 also include forming the smoothed casting pattern at 205, drying one or more layers of the mold material at 215, positioning the cured mold material within a particulate bed 230, separating the cured mold material from the investment casting at 245, and/or cleaning the investment casting at 250.

Forming the smoothed casting pattern at 205, when performed, includes forming a smoothed casting pattern that includes a casting pattern defined by a casting pattern material, a first coating material that coats and seals the casting pattern, and a second coating material that coats the first coating material. In some examples, the forming at 205 includes forming the smoothed casting pattern as described in more detail herein with respect to methods 100.

Referring again to the examples of FIG. 7, methods 200 include covering the smoothed casting pattern with a mold material at 210. The covering at 210 includes covering the smoothed casting pattern to define an enclosed mold volume that may encapsulate the smoothed casting pattern. The covering at 210 may be achieved in any suitable manner such that the mold material suitably covers the smoothed casting pattern to define the enclosed mold volume. In some examples, the covering at 210 includes covering some, most, or the entire surface of the smoothed casting pattern with the mold material. Stated another way, and in some such examples, the mold material is applied to cover some, most, or the entire surface of the second-non conformal coating material and/or the plurality of smoothing coatings of the smoothed casting pattern.

In some examples, the covering at 210 includes covering the smoothed casting pattern with a single layer of mold material. In some examples, the covering at 210 includes covering the smoothed casting pattern with a plurality of layers of the mold material. The smoothed casting pattern is covered with the mold material in any suitable manner, such as by dipping the smoothed casting pattern in a volume of the mold material, spraying the mold material onto the smoothed casting pattern, pouring the mold material onto the smoothed casting pattern, and/or painting the mold material onto the smoothed casting pattern. In some examples, the covering at 210 includes covering the smoothed casting pattern with an uncured, under-cured, unhardened, and/or under-hardened mold material, such that the mold material is cured during the drying at 215 and/or the curing at 220 of methods 200, as described herein.

The mold material is applied to the smoothed casting pattern while the mold material is in any suitable physical state, such as to facilitate the covering at 210. Examples of the physical state of the mold material when it is applied to the smoothed casting pattern include a liquid, a powder, solution, a vapor, a solid, and/or a dispersion. It is within the scope of the present disclosure that the mold material includes any one or more mold material(s) that are suitable for the investment casting process. Specific examples of the mold material include a ceramic and/or a stucco.

Figure 8:
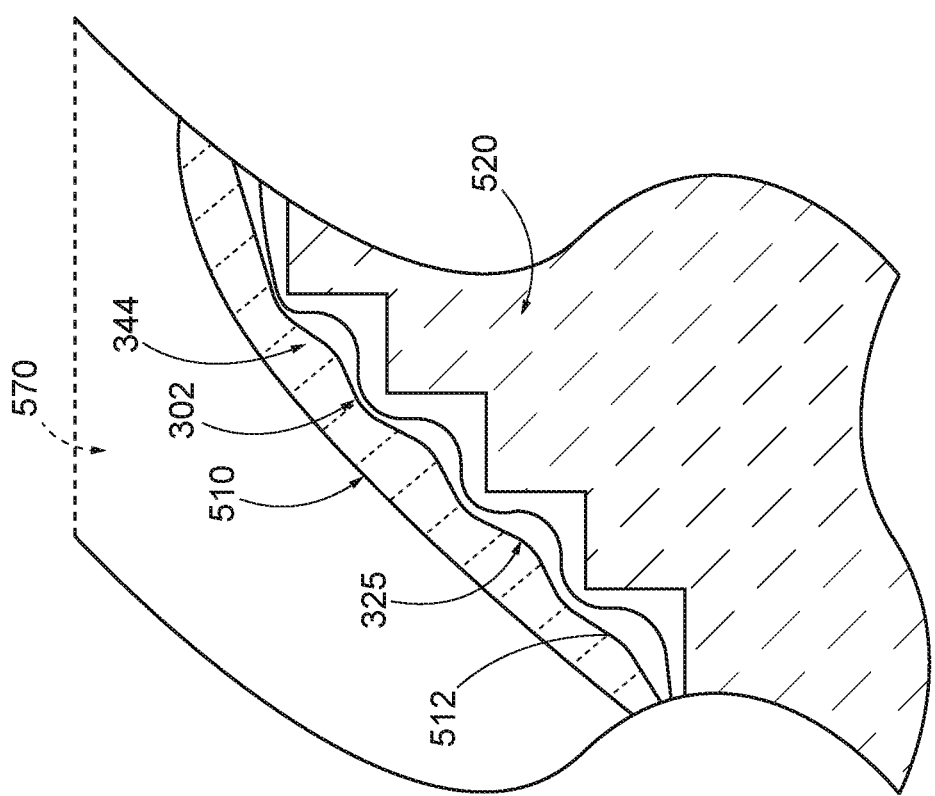
FIG. 8 is a schematic illustration of examples of a portion of a smoothed casting pattern covered with a mold material formed utilizing the methods of FIG. 7.

FIG. 8 illustrates examples of a portion of smoothed casting pattern 325 covered with mold material 500 according to methods 200. More specifically, FIG. 8 illustrates mold material 500 covering an external surface of smoothed casting pattern 325 to define enclosed mold volume 520, which encapsulates smoothed casting pattern 325. As shown, in some examples, the covering at 210 includes covering an outer surface of second coating material 420 with mold material 500, and in some examples, covering at 210 includes covering an outer surface of plurality of smoothing coatings 442 with mold material 500. In either example, the interior surface of mold material 500 adapts to, takes the shape of, and/or conforms to surface finish 302 of smoothed casting pattern 325. Put in slightly different terms, smoothed casting pattern 325 defines a shape of enclosed mold volume 520, which in turn defines desired shape 344 of the investment casting.

As illustrated in FIG. 8, in some examples, the covering at 210 includes covering smoothed casting pattern 325 with a single layer of mold material 500 and in some examples, the covering at 210 includes covering smoothed casting pattern 325 with a plurality of layers of mold material 500. For examples that include covering with the plurality of layers of mold material 500, each covering of mold material 500 is applied subsequent to the previous coating, and/or covers some, most, or the entire surface of the previous coating of mold material 500. With continued reference to the examples of FIG. 8, the dashed lines positioned within mold material 500 indicate that the covering at 210 includes covering with one or more layers of uncured, under-cured, unhardened, under-hardened, liquid, dissolved, and/or dispersed mold material 500.

Returning to FIG. 7, methods 200 optionally include drying the one or more layer(s) of the mold material at 215. The drying at 215 includes at least partially drying, substantially drying, and/or completely drying the one or more layers of the mold material. The drying at 215 is performed subsequent to the covering at 210 and/or prior to curing at 220. The drying at 215 may be performed any number of times such that the one or more layers of the mold material are adequately dried. Additionally or alternatively, the drying at 215 may include drying the one or more layers of the mold material at least partially simultaneously. For examples in which the covering at 210 includes covering with the plurality of layers of the mold material, the drying at 215 is performed after covering with a previous layer of mold material and prior to covering with a subsequent layer of the mold material. The drying at 215 is performed for any suitable amount of time such that the one or more layers of the mold material are, for example, adequately dried prior to applying the subsequent layer of mold material, and/or prior to the curing at 220. Examples of the drying at 215 include drying for at least 0.1 hours, at least 0.2 hours, at least 0.3 hours, at least 0.4 hours, at least 0.5 hours, at least 1 hour, at least 5 hours, at least 12 hours, and/or at least 1 day, and/or drying for at most 0.1 hours, at most 0.2 hours, and/or at most 0.5 hours.

As indicated in the examples depicted in FIG. 7, methods 200 include curing the one or more layers of the mold material at 220. More specifically, the curing at 220 includes curing the one or more layers of mold material to form the cured mold material. The curing at 220 is performed subsequent to the covering at 210 and/or subsequent to the drying at 215. Additionally or alternatively, the curing at 220 is performed prior to, or at least partially simultaneously with the flowing at 225. In some examples, the curing at 220 includes drying the one or more layers of the mold material. For examples in which the covering at 210 includes covering with a plurality of layers of the mold material, the curing at 220 may be performed intermittent to covering with individual layers of the mold material. In some such examples, the curing at 210 is performed following covering with a previous layer of the mold material and before covering with a subsequent layer of the mold material, such that the subsequent layer of the mold material is covered onto a cured, previous layer of the mold material.

The curing at 220 includes hardening, solidifying, dehydrating, densifying, sintering, and/or strengthening the one or more layers of the mold material. Stated in slightly different terms, the curing at 220 is configured to render the cured mold material suitable to at least partially retain, maintain, or support the shape of the enclosed mold volume subsequent to the flowing at 225. The curing at 220 may be performed in any suitable manner such that the cured mold material is suitable for methods 200 and/or the investment casting process.

In some examples, the curing at 220 includes heating the one or more layer(s) of the mold material to at least a threshold curing temperature. Examples of the threshold curing temperature include at least one of at least 20 degrees Celsius (° C.), at least 40° C., at least 100° C., at least 300° C., at least 600° C., at least 800° C., at least 900° C., at least 1000° C., at least 1100° C., at least 1400° C., at least 1700° C., at most 1100° C., and/or at most 1000° C. In some examples, the curing at 220 is adequately achieved without heating the one or more layer(s) of mold material.

Figure 9:
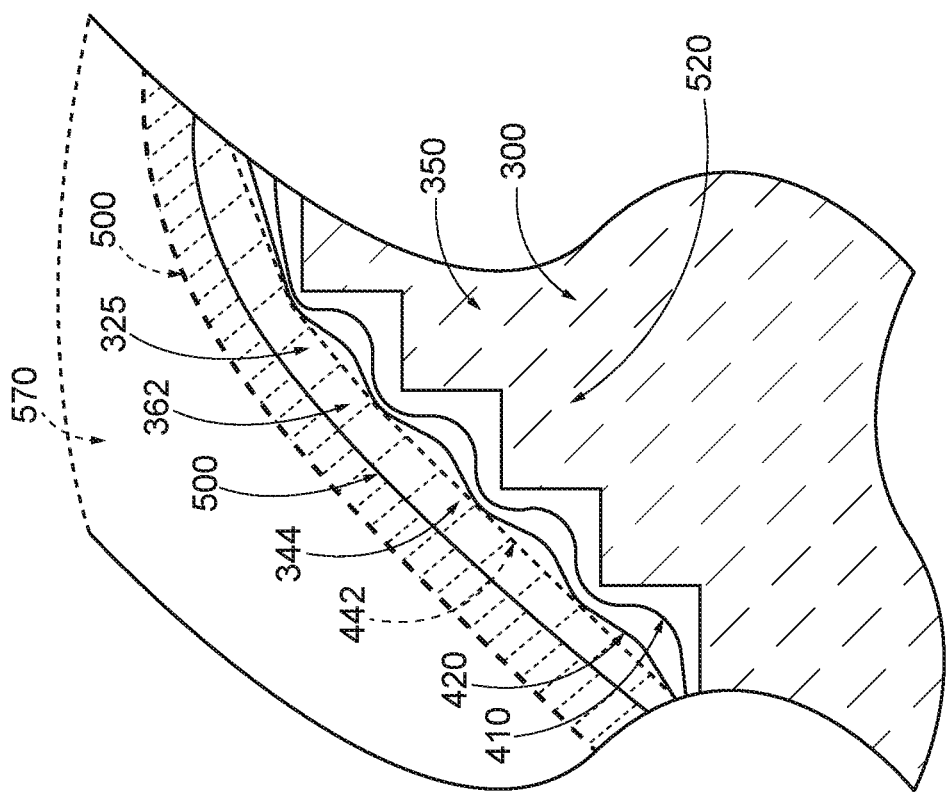
FIG. 9 is a schematic illustration of an example of a portion of a smoothed casting pattern covered with a cured mold material formed utilizing the methods of FIG. 7.

FIG. 9 illustrates an example of a portion of smoothed casting pattern 325 coated with cured mold material 510. In the example shown, cured mold material 510 covers smoothed casting pattern 325 to define an enclosed mold volume 520 that encapsulates smoothed casting pattern 325. As indicated in the solid lines disposed within cured mold material 510, cured mold material 510 is cured, solidified, dried, dehydrated, densified, sintered, and/or strengthened relative to mold material 500 that is illustrated in dashed lines in the example of FIG. 8. Further illustrated in the example of FIG. 9, cured mold material 510 covers some, most, or the entire surface of smoothed casting pattern 325. Additionally or alternatively, the inside or interior surface of cured mold material 512 adopts to, take the shape of, and/or conform to surface finish 302 of smoothed casting pattern 325. Thus, the inside or interior surface of cured mold material 512 adapts to or defines desired shape 344 of the investment casting.

With continued reference to the examples depicted in FIG. 7, methods 200 further include flowing from the enclosed mold volume at 225. More specifically, the flowing at 225 includes flowing the casting pattern material, the first coating material, the second coating material, and optionally the plurality of smoothing coatings, which collectively are described as the smoothed casting pattern material(s), from within the cured mold material to define a void space within the enclosed mold volume. As discussed herein, the flowing at 225 is performed subsequent to, or at least partially simultaneously with, the curing at 220. Additionally or alternatively, the flowing at 225 is performed prior to the positioning at 230 and/or prior to the filling at 235.

As defined herein, flowing also may be referred to as removing and/or evacuating. The flowing at 225 is configured to remove some, most, or the entirety of the material(s) that define the smoothed casting pattern from within the enclosed mold volume such as to produce the void space. With this in mind, and as discussed herein, in some examples the smoothed casting pattern material(s) are selected such that the smoothed casting pattern is readily flowed from the enclosed mold volume.

The flowing at 225 is achieved in any suitable manner. In some examples, flowing of the casting pattern material, the first coating material, the second coating material, and optionally the plurality of smoothing coatings are achieved via common and/or via distinct flowing mechanisms. Specific examples of the flowing at 225 include at least one of melting, vaporizing, and/or degrading the casting pattern material to flow the casting pattern material from within the enclosed mold volume. Likewise, the flowing at 225 may include at least one of melting, vaporizing, and/or degrading the first coating material, the second coating material, and/or optionally the plurality of smoothing coatings from within the enclosed mold volume. In some examples, the flowing at 225 is performed at an elevated temperature such as to facilitate the melting, vaporizing, and/or degrading of the smoothed casting pattern material(s). In some examples, the degrading includes combusting, or burning, one or more of the materials that define the smoothed casting pattern.

Figure 10:
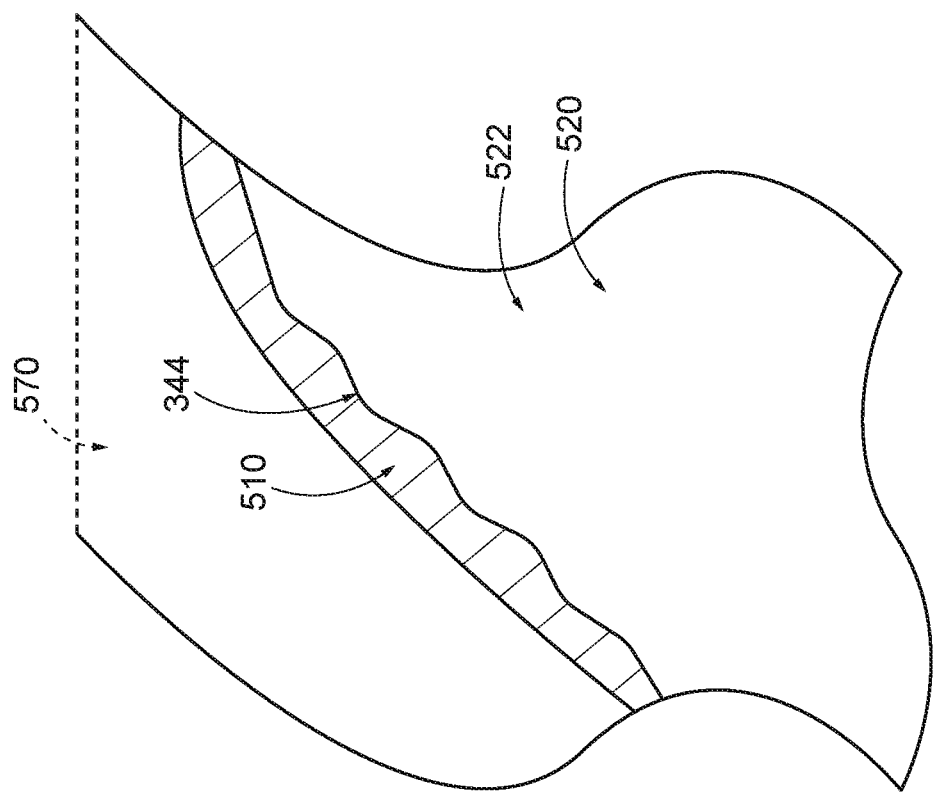
FIG. 10 is a schematic illustration of an example of a portion of a cured mold material formed utilizing the methods of FIG. 7.

FIG. 10 provides an illustrative example of a portion of cured mold material 510 prepared according to methods 200. As indicated in FIG. 10, cured mold material 510 encapsulates enclosed mold volume 520 to define a void space 522. The shape of enclosed mold volume 520 is defined, at least in part, by cured mold material 510 and corresponds to the shape of the external surface of the smoothed casting pattern. In some examples, enclosed mold volume 520 retains at least substantially the same shape subsequent to the flowing at 225 as prior to the flowing at 225. As such, enclosed mold volume 520 defines desired shape 344 of the investment casting. Further indicated in the example represented in FIG. 10, the flowing at 225 includes substantial and/or complete removal of smoothed casting pattern 325 from enclosed mold volume 520 to create void space 522.

As indicated in the examples of FIG. 7, in some examples, methods 200 include positioning the mold material within a particulate bed at 230. In some examples, the particulate bed includes a sand bed. In some examples, the particulate bed includes a volume of flowable particles that are configured to be at least partially displaced by, and surround at least some, most, or the entire external surface of the mold material. In such examples, the particulate bed provides structural support to the mold material during at least a subset of methods 200. The structural support provided by the particulate bed assists in the enclosed mold volume retaining the desired shape of the investment casting during one or more steps of methods 200, such as during the filling at 235 and/or the solidifying at 240.

As shown in the examples illustrated in FIGS. 8-12, particulate bed 570 is utilized to surround and/or to provide structural support to at least a portion of the external surface of mold material 500 and/or cured mold material 510. This support often is provided, or the positioning at 230 is performed, subsequent to the covering at 210, prior to the curing at 220, during the curing at 220, subsequent to the curing at 220, prior to the flowing at 225, during the flowing at 225, subsequent to the flowing at 225, during the filling at 235, and/or during the solidifying at 240.

With continued reference to the examples represented in FIG. 7, methods 200 further include filling the void space with a liquid investment casting material at 235. The filling at 235 is performed subsequent to the positioning at 230, subsequent to the flowing at 225, and/or prior to the solidifying at 240. The filling at 235 includes filling the void space with the liquid investment casting material such that the liquid investment casting material occupies, fills, and/or conforms to some, most, or the entirety of the enclosed mold volume. In some examples, the liquid investment casting includes a liquid metal, examples of which include liquid aluminum and/or liquid steel.

Figure 11:
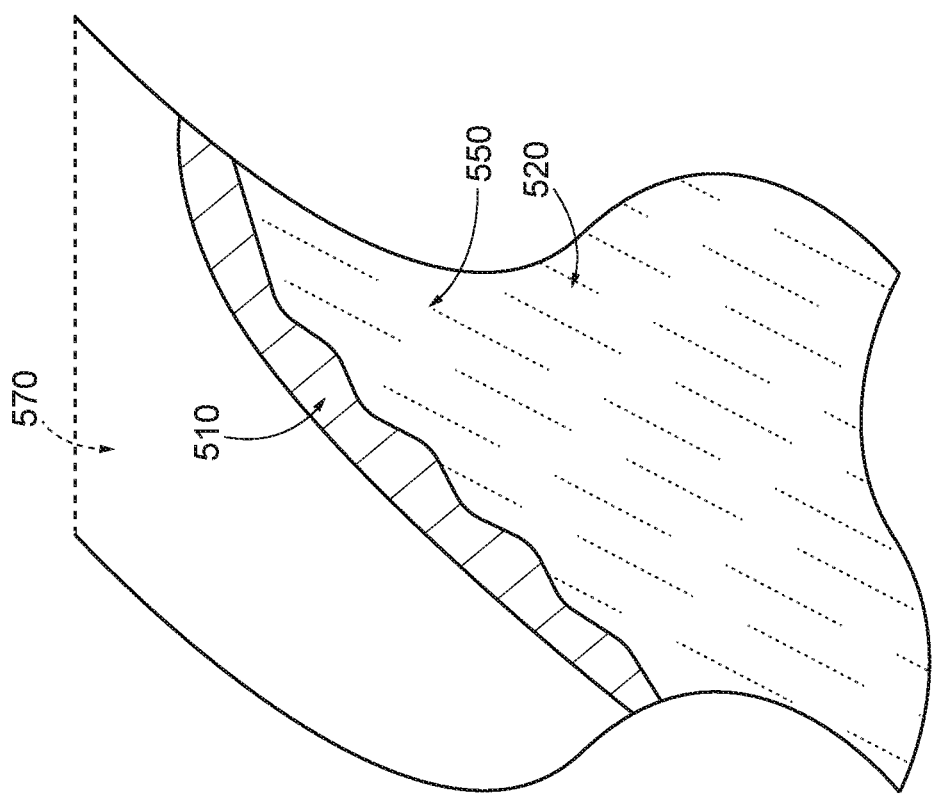
FIG. 11 is a schematic illustration of an example of a portion of an enclosed mold volume filled with a liquid investment casting material formed utilizing the methods of FIG. 7.

FIG. 11 provides an illustrative example of a portion of enclosed mold volume 520 defining void space 522 that has been filled with liquid investment casting material 550 according to methods 200. As shown, liquid investment casting material 550 occupies some, most, or all of void space 522. Further shown, liquid investment casting material 550 also conforms to the shape of enclosed mold volume 520 as defined at least in part by cured mold material 510.

Referring back to the examples of FIG. 7, methods 200 also include solidifying the liquid investment casting material at 240. The solidifying at 240 includes solidifying the liquid investment casting material within the void space to form and/or define the investment casting. The solidifying at 240 is performed subsequent to the filling at 235, prior to separating at 245, and/or prior to cleaning at 250. The solidifying at 240 is carried out in any suitable manner such that the investment casting is formed. In some examples, the solidifying at 240 includes cooling the liquid investment casting material to form a solidified investment casting. In some examples, the solidifying at 240 includes solidifying or forming the investment casting in the shape of the enclosed mold volume and/or in the desired shape of the investment casting.

Figure 12:
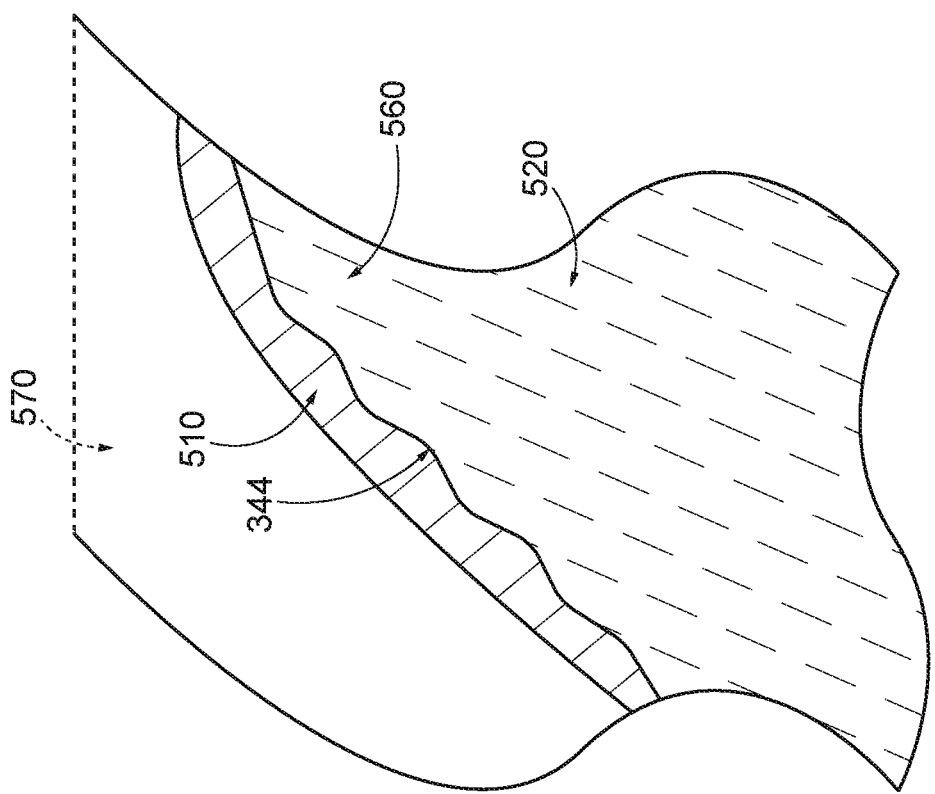
FIG. 12 is a schematic illustration of an example of a portion of an investment casting formed utilizing the methods of FIG. 7.
Figure 13:
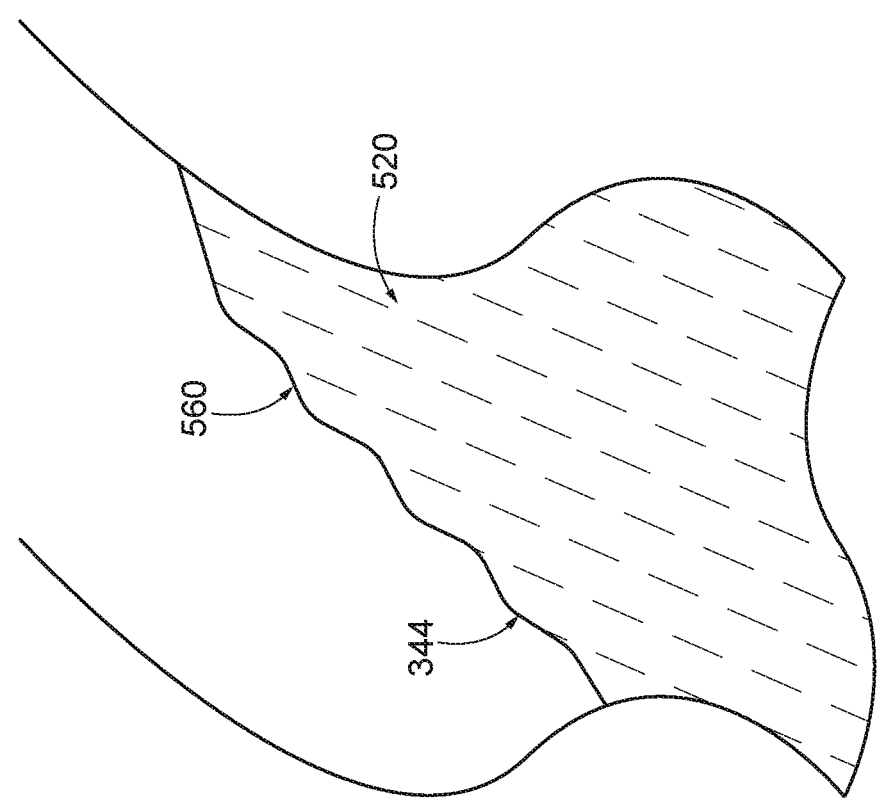
FIG. 13 is a schematic illustration of an example of a portion of an investment casting formed utilizing the methods of FIG. 7.

FIG. 12 illustrates an example of a portion the investment casting 560 prepared utilizing methods 200. Investment casting 560 occupies some, most, or all of void space 522 and/or enclosed mold volume 520. Investment casting 560 conforms or adapts to the shape of enclosed mold volume 520 as defined at least in part by cured mold material 510. As such, investment casting 560 conforms to or includes desired shape 344 of the investment casting.

As indicated in the examples of FIG. 7, methods 200 optionally include separating the cured mold material from the investment casting at 245. The separating at 245, when performed, is subsequent to the solidifying at 240 and/or prior to the cleaning at 250. In some examples, the separating at 245 includes breaking apart the cured mold material such as to permit and/or to facilitate removal of the investment casting from the cured mold material.

Further indicated in the examples of FIG. 7, methods 200 also optionally include cleaning the investment casting at 250. The cleaning at 250, when performed, is subsequent to the separating at 245 and is configured to remove any debris, and/or material deposited on the investment casting from the investment casting process.

FIG. 12 provides an example of a portion of investment casting 560 prepared according to methods 200. More specifically, the example of FIG. 12 illustrates cured mold material 510 as having been separated from investment casting 560, and optionally investment casting 560 as having been cleaned subsequent to separating cured mold material 510. As shown, investment casting 560 retains the shape defined by void space 522 and/or enclosed mold volume 520 after cured mold material 510 has been removed from investment casting 560, and thus conforms to or includes desired shape 344 of the investment casting.

Methods 200 include forming the investment casting with an improved fatigue strength and/or an improved fatigue life relative to a comparable investment casting that is formed utilizing a conventional casting pattern that is not smoothed casting pattern 325 according to the present disclosure. Additionally or alternatively, methods 200 include forming the investment casting with decreased stress risers relative to a comparable investment casting that is formed utilizing the conventional casting pattern that is not smoothed casting pattern 325 according to the present disclosure.

More specifically, it is generally known that typical additive manufacturing processes can produce 3D objects having a surface roughness of approximately 600-1000 microinches $R_a$, while machined surface roughness generally is on the order of 63-125 microinches $R_a$. It also is generally known that the surface roughness of casting patterns usually is transferred to the corresponding investment castings during the investment casting process, thereby forming investment castings having similar surface roughness. It follows that utilizing conventional casting patterns formed via additive manufacturing in the investment casting process form investment castings having surface roughness on the order of 600-1000 microinches $R_a$.

The particularly large surface roughness of investment castings formed utilizing the conventional additively manufactured casting patterns can cause up to an 85% reduction in elongation (ductility) in the investment casting relative to comparable machined components. This reduction in elongation not only imposes a negative effect on the toughness of such investment castings, (i.e. the ability of the investment castings to handle mechanical loads, specifically impact), but it also negatively affects the fatigue life and/or the fatigue strength of the investment castings. Perhaps more specifically, material cracks can form more easily with low elongation which degrades the fatigue life and fatigue strength of the investment casting. Moreover, surface roughness can cause discontinuities in applied loads by forming stress concentrations or stress raisers, which further compounds the issues associated with low elongation.

In addition to the casting pattern and the first coating material, the smoothed casting pattern disclosed herein includes the second coating material and optionally the plurality of smoothing coatings. As discussed herein, the second-non conformal coating material and/or the plurality of smoothing coatings render the surface finish of the smoothed casting pattern with a lower surface roughness compared to a casting pattern that does not include the second coating material and/or the plurality of smoothing coatings. Therefore, utilizing the smoothed casting pattern disclosed herein to form the investment casting, for example, utilizing methods 200, also will render the investment casting with reduced surface roughness as compared to an investment casting that is formed with a casting pattern that does not include the second coating material and/or the plurality of smoothing coatings. Thus, at least for the reasons discussed herein, the investment casting formed according to methods 200 and/or formed utilizing the smoothed casting pattern disclosed herein possess decreased stress risers, improved fatigue life, and/or improved fatigue strength as compared to an investment casting formed utilizing a casting pattern that does not include the second coating material and/or the plurality of smoothing coatings.

Illustrative, non-exclusive examples of inventive subject matter according to the present disclosure are described in the following enumerated paragraphs:

A1. A method of improving a surface finish of a casting pattern for an investment casting process, the method comprising:

sealing the casting pattern by coating the casting pattern with a first coating material to form a sealed casting pattern; and smoothing the sealed casting pattern by coating the sealed casting pattern with a second coating material to form a smoothed casting pattern.

A2. The method of paragraph A1, wherein the casting pattern includes a stepped surface finish, and wherein the smoothing includes smoothing the stepped surface finish with the second coating material.

A3. The method of paragraph A2, further comprising at least one of:
(i) forming the casting pattern; and
(ii) forming the casting pattern via an additive manufacturing process.

A4. The method of any of paragraphs A1-A3, wherein the forming the casting pattern includes forming the casting pattern with the stepped surface finish, and further wherein the sealing and the smoothing include smoothing the stepped surface finish.

A5. The method of any of paragraphs A1-A4, wherein the investment casting process is configured to utilize the smoothed casting pattern to generate an investment casting, and further wherein the casting pattern includes an undersized casting pattern, wherein the sealing and the smoothing both include increasing a size of the undersized casting pattern, and further wherein the undersized casting pattern is sized such that the smoothed casting pattern defines a desired shape for the investment casting.

A6. The method of any of paragraphs A2-A5, wherein the forming the casting pattern includes forming at least one of a polymeric casting pattern and a polymethyl methacrylate (PMMA) casting pattern.

A7. The method of any of paragraphs A1-A6, wherein the casting pattern is a thin-walled casting pattern.

A8. The method of any of paragraphs A2-A7, wherein at least one thickness of the casting pattern is less than 10 millimeters (mm), less than 5 mm, less than 4 mm, less than 3 mm, less than 2.5 mm, less than 2 mm, less than 1.5 mm, less than 1 mm, less than 0.5 mm, and/or at least 1.5 mm, at least 2 mm, at least 3 mm, and/or at least 5 mm.

A9. The method of any of paragraphs A1-A8, wherein:
(i) the first coating material includes a first wax, wherein
(ii) the second coating material includes a second wax; and further wherein
(iii) the second wax differs from the first wax.

A10. The method of any of paragraphs A1-A8, wherein at least one of the first coating material and the second coating material includes at least one of:
(i) a natural wax;
(ii) a synthetic wax;
(iii) stearic acid;
(iv) paraffin;
(v) an animal-based wax;
(vi) a vegetable-based wax;
(vii) a resin;
(viii) terpene resin;
(ix) petroleum resin;
(x) a rosin;
(xi) a rosin ester;
(xii) gum damar;
(xiii) a modified phenolic;
(xiv) a low molecular weight alkyd;
(xv) chlorinated naphthalene;
(xvi) chlorinated biphenyl;
(xvii) beeswax;
(xviii) carnuba wax;
(xix) candelilla wax;
(xx) mineral wax;
(xxi) microcrystalline wax;
(xxii) montan;
(xxiii) an amide wax;
(xxiv) an ester wax;
(xxv) a Fischer-Tropsch wax;
(xxvi) a castor oil derived wax;
(xxvii) a polymer;
(xxviii) a crosslinking polymer; and
(xxix) a thermosetting polymer.

A11. The method of any of paragraphs A1-A10, wherein, during the sealing, the first coating material has a first viscosity, and further wherein, during the smoothing, the second coating material has a second viscosity.

A12. The method of paragraph A11, wherein at least one of:
(i) the first viscosity differs from the second viscosity; and
(ii) the first viscosity is less than the second viscosity.

A13. The method of any of paragraphs A11-A12, wherein the second viscosity is at least a threshold multiple of the first viscosity, optionally wherein the threshold multiple is at least one of at least 1, at least 1.1, at least 1.2, at least 1.4, at least 1.6, at least 1.8, at least 2, at least 2.5, at least 3, at least 4, or at least 5.

A14. The method of any of paragraphs A1-A13, wherein, during the sealing, the first coating material has a first surface tension, and further wherein, during the smoothing, the second coating material has a second surface tension.

A15. The method of paragraph A14, wherein at least one of:
(i) the first surface tension differs from the second surface tension; and
(ii) the first surface tension is less than the second surface tension.

A16. The method of any of paragraphs A14-A15, wherein the second surface tension is at least a threshold multiple of the first surface tension, optionally wherein the threshold multiple is at least one of at least at least 1, at least 1.05, at least 1.1, at least 1.15, at least 1.2, at least 1.3, at least 1.4, at least 1.5, at least 1.6, at least 1.7, at least 1.8, at least 1.9, or at least 2.

A17. The method of any of paragraphs A1-A16, wherein the sealing includes at least one of:
(i) spraying the first coating material onto the casting pattern;
(ii) dipping the casting pattern into a volume of the first coating material; and
(iii) painting the first coating material onto the casting pattern.

A18. The method of any of paragraphs A1-A17, wherein the smoothing includes at least one of:
(i) spraying the second coating material onto the sealed casting pattern;
(ii) dipping the sealed casting pattern into a volume of the second coating material;
(iii) painting the second coating material onto the sealed casting pattern; and
(iv) enrobing the sealed casting pattern within the second coating material.

A19. The method of any of paragraphs A1-A18, wherein at least one of:
(i) subsequent to the sealing and prior to the smoothing, the method further includes hardening the first coating material; and
(ii) subsequent to the smoothing, the method further includes hardening the second coating material.

A20. The method of any of paragraphs A1-A19, wherein the smoothing includes forming a smoothing coating of the second coating material on the sealed casting pattern to define the smoothed casting pattern.

A21. The method of paragraph A20, wherein the smoothing coating is a first smoothing coating, and further wherein the method includes repeating the smoothing a plurality of times to form a corresponding plurality of smoothing coatings on the sealing casting pattern and define the smoothed casting pattern.

A22. The method of paragraph A21, wherein the plurality of smoothing coatings includes at least one of at least 2, at least 3, at least 4, at least 5, at least 6, at least 7, at least 8, or at least 10 smoothing coatings.

A23. The method of any of paragraphs A1-A22, wherein, prior to the sealing, the method further includes abrading the casting pattern to decrease a surface roughness of the casting pattern.

A24. The method of paragraph A23, wherein the abrading includes at least one of:
(i) sanding the casting pattern;
(ii) grinding the casting pattern; and
(iii) abrasive blasting the casting pattern.

B1. A method of forming an investment casting, the method comprising:
covering a smoothed casting pattern with a mold material to define an enclosed mold volume that encapsulates the smoothed casting pattern, wherein the smoothed casting pattern includes:
(i) a casting pattern defined by a casting pattern material;
(ii) a first coating material that coats and seals the casting pattern; and
(iii) a second coating material that coats the first coating material;
curing the mold material to form a cured mold material;
flowing the casting pattern material, the first coating material, and the second coating material from within the cured mold material to define a void space within the enclosed mold volume;
filling the void space with a liquid investment casting material; and
solidifying the liquid investment casting material, within the void space, to form the investment casting.

B2. The method of paragraph B1, wherein the forming the smoothed casting pattern includes performing the method of any of paragraphs A1-A24.

B3. The method of any of paragraphs B1-B2, further comprising forming the smoothed casting pattern, wherein the forming includes forming the smoothed casting pattern of any of paragraphs C1-C6.

B4. The method of any of paragraphs B1-B3, wherein the covering the smoothed casting pattern includes coating the smoothed casting pattern with a plurality of layers of the mold material.

B5. The method of paragraph B4, wherein the mold material includes at least one of:
(i) a ceramic; and
(ii) a stucco.

B6. The method of any of paragraphs B4-B5, wherein the method further includes at least partially drying each layer of the plurality of layers of the mold material prior to coating the smoothed casting pattern with a subsequent layer of the plurality of layers of mold material.

B7. The method of any of paragraphs B1-B6, wherein the curing the mold material includes drying the mold material.

B8. The method of any of paragraphs B1-B7, wherein the curing the mold material includes heating the mold material to at least a threshold curing temperature.

B9. The method of any of paragraphs B1-B8, wherein the flowing includes at least one of:
(i) melting the casting pattern material to flow the casting pattern material from the enclosed mold volume;
(ii) vaporizing the casting pattern material to flow the casting pattern material from the enclosed mold volume;
(iii) degrading the casting pattern material to flow the casting pattern material from the enclosed mold volume;
(iv) melting the first coating material to flow the casting pattern material from the enclosed mold volume;
(v) vaporizing the first coating material to flow the casting pattern material from the enclosed mold volume;
(vi) degrading the first coating material to flow the casting pattern material from the enclosed mold volume;
(vii) melting the second coating material to flow the casting pattern material from the enclosed mold volume;
(viii) vaporizing the second coating material to flow the casting pattern material from the enclosed mold volume; and
(ix) degrading the second coating material to flow the casting pattern material from the enclosed mold volume.

B10. The method of any of paragraphs B1-B9, wherein the method further includes positioning the mold material within a particulate bed, optionally wherein the particulate bed includes a sand bed.

B11. The method of paragraph B10, wherein the positioning is at least one of:
(i) subsequent to the covering;
(ii) subsequent to the curing;
(iii) subsequent to the flowing; and
(iv) prior to the filling.

B12. The method of any of paragraphs B1-B11, wherein the filling the void space includes filling the void space with the liquid investment casting material that includes at least one of:
(i) a liquid metal;
(ii) liquid aluminum; and
(iii) liquid steel.

B13. The method of any of paragraphs B1-B12, wherein the solidifying the liquid casting material includes cooling the liquid investment casting material.

B14. The method of any of paragraphs B1-B13, wherein, subsequent to the solidifying, the method further includes separating the cured mold material from the investment casting.

B15. The method of paragraph B14, wherein the separating includes breaking apart the cured mold material.

B16. The method of any of paragraphs B14-B15, wherein, subsequent to the separating, the method further includes cleaning the investment casting.

B17. The method of any of paragraphs B1-B16, wherein the method includes forming the investment casting with an improved fatigue strength relative to a comparable investment casting that is formed utilizing at least one of the casting pattern and the first coating material but that does not utilize the second coating material.

B18. The method of any of paragraphs B1-B17, wherein the method includes forming the investment casting with an improved fatigue life relative to a comparable investment casting that is formed utilizing at least one of the casting pattern and the first coating material but that does not utilize the second coating material.

B19. The method of any of paragraphs B1-B18, wherein the method includes forming the investment casting with decreased stress risers relative to a comparable investment casting that is formed utilizing at least one of the casting pattern and the first coating material but that does not utilize the second coating material.

C1. A smoothed casting pattern, comprising:
a casting pattern defined by a casting pattern material;
a first coating material that coats and seals the casting pattern; and
a second coating material that coats the first coating material.

C2. The smoothed casting pattern of paragraph C1, wherein the casting pattern has a stepped surface finish that defines a plurality of inside corners, and further wherein:
(i) the first coating material preferentially coats the plurality of inside corners by a first coating ratio; and
(ii) the second coating material preferentially coats the plurality of inside corners by a second coating ratio.

C3. The smoothed casting pattern of paragraph C2, wherein at least one of the first coating ratio and the second coating ratio is at least one of:
(i) at least 1, at least 1.2, at least 1.3, at least 1.4, at least 1.5, at least 2, at least 3, at least 4, at least 5, at least 6, at least 8, at least 10; and
(ii) at most 100, at most 80, at most 60, at most 50, at most 40, at most 30, at most 20, at most 10, and at most 5.

C4. The smoothed casting pattern of any of paragraphs C2-C3, wherein the second coating ratio is a threshold multiple of the first coating ratio, optionally wherein the threshold multiple is at least 1.1, at least 1.2, at least 1.3, at least 1.4, at least 1.5, at least 1.6, at least 1.7, at least 1.8, at least 1.9, at least 2, at least 2.5, at least 3, at least 4, or at least 5.

C5. The smoothed casting pattern of any of paragraphs C2-C4, wherein each inside corner of the plurality of inside corners is defined by a first surface and a second surface that meets the first surface at an intersection angle, optionally wherein the intersection angle is at least one of:
(i) at least 50 degrees, at least 60 degrees, at least 70 degrees, at least 80 degrees, at least 85 degrees, or at least 89 degrees;
(ii) substantially 90 degrees; and
(iii) at most 130 degrees, at most 120 degrees, at most 110 degrees, at most 100 degrees, at most 95 degrees, or at most 91 degrees.

C6. The smoothed casting pattern of any of paragraphs C1-C5, wherein the smoothed casting pattern further includes a mold material that coats an external surface of the second coating material.

D1. An aircraft including at least one component formed utilizing the method of any of paragraphs A1-B19 or the smoothed casting pattern of any of paragraphs C1-C6.

E1. The use of a first coating material and a second coating material to decrease a surface roughness of a casting pattern for an investment casting.

E2. The use of any of the methods of any of paragraphs A1-A24 to form the smoothed casting pattern of any of paragraphs C1-C6.

E3. The use of the smoothed casting pattern of any of paragraphs C1-C6 with any of the methods of any of paragraphs B1-B19.

E4. The use of any of the methods of any of paragraphs A1-A24 to form at least one component of an aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method of improving a surface finish of a casting pattern for an investment casting process, the method comprising:
    sealing the casting pattern by coating the casting pattern with a first coating material to form a sealed casting pattern; and
    smoothing the sealed casting pattern by coating the sealed casting pattern with a second coating material to form a smoothed casting pattern;
    wherein the casting pattern includes a stepped surface finish and the smoothing includes smoothing the stepped surface finish with the second coating material.

2. The method of claim 1, wherein the casting pattern is an undersized casting pattern that is sized such that, subsequent to the sealing and the smoothing, the smoothed casting pattern defines a desired shape for an investment casting.

3. The method of claim 1, wherein the casting pattern is a thin-walled casting pattern having a minimum wall thickness less than 2.5 millimeters, wherein the sealing includes sealing the thin-walled casting pattern, and further wherein the smoothing includes smoothing the thin-walled casting pattern.

4. The method of claim 1, wherein, during the sealing, the first coating material has a first viscosity, wherein, during the smoothing, the second coating material has a second viscosity, and further wherein at least one of:
    (i) the first viscosity differs from the second viscosity; and
    (ii) the first viscosity is less than the second viscosity.

5. The method of claim 4, wherein the second viscosity is at least 1.1 times the first viscosity.

6. The method of claim 1, wherein the smoothing includes at least one of:
    (i) spraying the second coating material onto the sealed casting pattern;
    (ii) dipping the sealed casting pattern into a volume of the second coating material;
    (iii) painting the second coating material onto the sealed casting pattern; and
    (iv) enrobing the sealed casting pattern within the second coating material.

7. The method of claim 1, wherein the method further includes repeating the smoothing a plurality of times to form a corresponding plurality of smoothing coatings on the casting pattern and define the smoothed casting pattern.

8. The method of claim 1, wherein the first coating material includes a first wax, wherein the second coating material includes a second wax, and further wherein the second wax differs from the first wax.

9. The method of claim 1, wherein the casting pattern has a stepped surface finish that defines a plurality of inside corners, and further wherein the sealing includes coating the plurality of inside corners by a first coating ratio of at least 1.1.

10. The method of claim 1, wherein the casting pattern has a stepped surface finish that defines a plurality of inside corners, and further wherein the smoothing includes coating the plurality of inside corners by a second coating ratio of at least 1.1.

11. The method of claim 1, further comprising hardening the second coating material subsequent to the smoothing the sealed casting pattern.

12. The method of claim 1, wherein the method further includes forming an investment casting by:
    (i) covering the smoothed casting pattern with a mold material to define an enclosed mold volume that encapsulates the smoothed casting pattern;
    (ii) curing the mold material to form a cured mold material;
    (iii) flowing a casting pattern material of the casting pattern, the first coating material, and the second coating material from within the cured mold material to define a void space within the enclosed mold volume;
    (iv) filling the void space with a liquid investment casting material; and
    (v) solidifying the liquid investment casting material, within the void space, to form the investment casting.

13. A method of forming an investment casting, the method comprising:
    covering a smoothed casting pattern with a mold material to define an enclosed mold volume that encapsulates the smoothed casting pattern, wherein the smoothed casting pattern includes:
    (i) a casting pattern defined by a casting pattern material;
    (ii) a first coating material that coats and seals the casting pattern; and
    (iii) a second coating material that coats the first coating material;
    curing the mold material to form a cured mold material;
    flowing the casting pattern material, the first coating material, and the second coating material from within the cured mold material to define a void space within the enclosed mold volume;
    filling the void space with a liquid investment casting material; and
    solidifying the liquid investment casting material, within the void space, to form the investment casting.

14. The method of claim 13, wherein the covering the smoothed casting pattern includes covering the smoothed casting pattern with a plurality of layers of the mold material.

15. The method of claim 13, wherein the flowing includes at least one of:
    (i) melting the casting pattern material to flow the casting pattern material from the enclosed mold volume;
    (ii) vaporizing the casting pattern material to flow the casting pattern material from the enclosed mold volume;

(iii) degrading the casting pattern material to flow the casting pattern material from the enclosed mold volume;
(iv) melting the first coating material to flow the casting pattern material from the enclosed mold volume;
(v) vaporizing the first coating material to flow the casting pattern material from the enclosed mold volume;
(vi) degrading the first coating material to flow the casting pattern material from the enclosed mold volume;
(vii) melting the second coating material to flow the casting pattern material from the enclosed mold volume;
(viii) vaporizing the second coating material to flow the casting pattern material from the enclosed mold volume; and
(ix) degrading the second coating material to flow the casting pattern material from the enclosed mold volume.

16. A smoothed casting pattern, comprising:
a casting pattern defined by a casting pattern material;
a first coating material that coats and seals the casting pattern; and
a second coating material that coats the first coating material;
wherein the casting pattern has a stepped surface finish that defines a plurality of inside corners, and further wherein at least one of:
(i) the first coating material coats the plurality of inside corners by a first coating ratio of at least 1.1; and
(ii) the second coating material coats the plurality of inside corners by a second coating ratio of at least 1.1.

17. A method of improving a surface finish of a casting pattern for an investment casting process, the method comprising:
sealing the casting pattern by coating the casting pattern with a first coating material to form a sealed casting pattern; and
smoothing the sealed casting pattern by coating the sealed casting pattern with a second coating material to form a smoothed casting pattern;
wherein, during the sealing, the first coating material has a first viscosity, wherein, during the smoothing, the second coating material has a second viscosity, and further wherein the second viscosity is at least 1.1 times the first viscosity.

18. A method of improving a surface finish of a casting pattern for an investment casting process, the method comprising:
sealing the casting pattern by coating the casting pattern with a first coating material to form a sealed casting pattern; and
smoothing the sealed casting pattern by coating the sealed casting pattern with a second coating material to form a smoothed casting pattern;
wherein the first coating material includes a first wax, wherein the second coating material includes a second wax, and further wherein the second wax differs from the first wax.

19. A method of improving a surface finish of a casting pattern for an investment casting process, the method comprising:
sealing the casting pattern by coating the casting pattern with a first coating material to form a sealed casting pattern; and
smoothing the sealed casting pattern by coating the sealed casting pattern with a second coating material to form a smoothed casting pattern;
wherein the casting pattern has a stepped surface finish that defines a plurality of inside corners, and further wherein at least one of:
(i) the sealing includes coating the plurality of inside corners by a first coating ratio of at least 1.1; and
(ii) the smoothing includes coating the plurality of inside corners by a second coating ratio of at least 1.1.

20. A method of improving a surface finish of a casting pattern for an investment casting process, the method comprising:
sealing the casting pattern by coating the casting pattern with a first coating material to form a sealed casting pattern;
smoothing the sealed casting pattern by coating the sealed casting pattern with a second coating material to form a smoothed casting pattern; and
forming an investment casting by:
(i) covering the smoothed casting pattern with a mold material to define an enclosed mold volume that encapsulates the smoothed casting pattern;
(ii) curing the mold material to form a cured mold material;
(iii) flowing a casting pattern material of the casting pattern, the first coating material, and the second coating material from within the cured mold material to define a void space within the enclosed mold volume;
(iv) filling the void space with a liquid investment casting material; and
(v) solidifying the liquid investment casting material, within the void space, to form the investment casting.

* * * * *